United States Patent [19]
D'Aluisio et al.

[11] Patent Number: 6,145,862
[45] Date of Patent: *Nov. 14, 2000

[54] BICYCLE SUSPENSION SYSTEM

[75] Inventors: Christopher P. D'Aluisio, Bethel; Mario M. Galasso, Redding; Ross P. Collins, Danbury, all of Conn.; Mark S. Farris; Michael A. Harrison, both of Ketchum, Id.; John M. Loftus, Costa Mesa, Calif.; Aaron K. Taylor, Hailey, Id.; Christoph E. Mack, Georgetown, Conn.

[73] Assignee: Cannondale Corporation, Bethel, Conn.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/163,547

[22] Filed: Sep. 30, 1998

Related U.S. Application Data

[60] Division of application No. 08/715,536, Sep. 18, 1996, Pat. No. 5,924,714, which is a continuation-in-part of application No. 08/584,922, Jan. 11, 1996, Pat. No. 5,702,092, which is a division of application No. 08/037,949, Mar. 26, 1993, Pat. No. 5,494,302, which is a continuation-in-part of application No. 07/713,673, Jun. 11, 1991, Pat. No. 5,320,374.

[51] Int. Cl.[7] ........................................ B62K 1/00
[52] U.S. Cl. ......................... 280/276; 280/279; 280/283
[58] Field of Search ..................... 280/276, 279, 280/277, 274, 280, 283

[56] References Cited

U.S. PATENT DOCUMENTS

| | | |
|---|---|---|
| 575,152 | 1/1897 | Fogg . |
| 601,978 | 4/1898 | Nevill . |
| 636,726 | 11/1899 | Hindmarsh . |
| 689,970 | 12/1901 | Horack . |
| 723,075 | 3/1903 | Thoms . |
| 846,079 | 5/1907 | Yost . |
| 934,013 | 9/1909 | Preston . |

(List continued on next page.)

FOREIGN PATENT DOCUMENTS

| | | | |
|---|---|---|---|
| 321803 | 6/1989 | European Pat. Off. | ............... 280/276 |
| 420610 | 3/1991 | European Pat. Off. . | |

(List continued on next page.)

OTHER PUBLICATIONS

1993 Cannondale Catalogue.
1992 Cannondale Catalogue.
Bicycling (Apr. 1991), cover and pp. 84–98.

(List continued on next page.)

*Primary Examiner*—Daniel G. DePumpo
*Attorney, Agent, or Firm*—Pennie & Edmonds, LLP

[57] ABSTRACT

There is disclosed herein a suspension fork assembly particularly for use with bicycles. The assembly comprises an outer tube which is mounted via brackets to the steering tube of the bicycle frame, and an inner tube that telescopes within the outer tube. A shock absorbing system, preferably in the form of a cartridge is provided within the tubes. The inner surface of the outer tube and the outer surface of the inner tube each have a plurality of axially arranged opposing longitudinal flat sections, such as four on each tube. A plurality of needle bearings are disposed between the tubes on these flat sections. This arrangement, with the needle bearings arranged on the flat sections between the inner and outer tubes, allows the two tubes to freely telescope in and out with respect to one another without any significant static friction, and also serves to maintain torsional rigidity between the outer tube to the inner tube. The needle bearings thus bear radial loads as well as maintain the in line relationship of the outer and inner tubes for rotational forces while allowing the two tubes to freely telescope. Further, a rigid front blade is secured the inner tube to hold the front wheel of the vehicle and to provide bending and torsional stiffness.

24 Claims, 26 Drawing Sheets

OTHER PUBLICATIONS

| | | | |
|---|---|---|---|
| 2,477,748 | 8/1949 | Hutchins | 280/277 |
| 2,493,342 | 1/1950 | Eldred et al. | 244/104 |
| 2,590,050 | 3/1952 | Smith | 280/276 |
| 3,208,767 | 9/1965 | Moulton | 280/276 |
| 3,301,575 | 1/1967 | Ryan et al. | 280/276 |
| 3,327,814 | 6/1967 | Nickell | 188/129 |
| 3,337,240 | 8/1967 | Rizzato | 280/279 |
| 3,459,441 | 8/1969 | Hornsby | 280/276 |
| 3,797,276 | 3/1974 | Orain | 64/23.7 |
| 3,827,538 | 8/1974 | Morgan | 188/319 |
| 3,964,765 | 6/1976 | Zenser | 280/276 |
| 4,170,369 | 10/1979 | Strutman | 280/261 |
| 4,254,639 | 3/1981 | Teramachi | 64/23.7 |
| 4,509,386 | 4/1985 | Kimberlin | 74/492 |
| 4,537,374 | 8/1985 | Barnoin et al. | 244/102 R |
| 4,705,491 | 11/1987 | Andersson | 464/167 |
| 4,815,763 | 3/1989 | Hartmann | 280/276 |
| 4,898,566 | 2/1990 | Hakansson | 464/167 |
| 4,971,344 | 11/1990 | Turner | 280/276 |
| 5,044,648 | 9/1991 | Knapp | 280/276 |
| 5,074,678 | 12/1991 | Eberle | 384/49 |
| 5,157,987 | 10/1992 | Satoh et al. | 74/581 |
| 5,163,697 | 11/1992 | Kastan | 280/276 |
| 5,195,766 | 3/1993 | Dohrmann et al. | 280/276 |
| 5,275,264 | 1/1994 | Isella | 280/276 |
| 5,308,099 | 5/1994 | Browning | 280/276 |
| 5,320,374 | 6/1994 | Farris et al. | 280/276 |
| 5,335,928 | 8/1994 | Pong et al. | 280/259 |
| 5,380,027 | 1/1995 | Pong et al. | 280/279 |
| 5,390,947 | 2/1995 | Pong et al. | 280/286 |
| 5,413,368 | 5/1995 | Pong et al. | 280/277 |
| 5,451,071 | 9/1995 | Pong et al. | 280/281.1 |
| 5,494,302 | 2/1996 | Farris et al. | 280/276 |
| 5,509,675 | 4/1996 | Barnett | 280/276 |
| 5,702,092 | 12/1997 | Farris et al. | 267/64.15 |
| 5,924,714 | 7/1999 | Farris et al. | 280/276 |

FOREIGN PATENT DOCUMENTS

| | | | |
|---|---|---|---|
| 362619 | 7/1906 | France . | |
| 378835 | 10/1907 | France | 280/276 |
| 832315 | 9/1938 | France | 280/276 |
| 1103855 | 11/1995 | France | 280/276 |
| 415195 | 9/1946 | Italy | 280/287 |
| 416260 | 11/1946 | Italy . | |
| 439533 | 9/1948 | Italy | 280/276 |
| 440100 | 10/1948 | Italy | 280/276 |
| 264003 | 1/1927 | United Kingdom . | |
| 295316 | 11/1928 | United Kingdom . | |
| 469697 | 7/1937 | United Kingdom . | |
| 529305 | 11/1940 | United Kingdom . | |
| 585122 | 1/1947 | United Kingdom . | |
| 679169 | 9/1953 | United Kingdom | 280/276 |
| 2555940 | 11/1992 | United Kingdom | 280/276 |

OTHER PUBLICATIONS

Mountain Bike Action (Feb. 1991), cover and pp. 5, 32–34, 36–43, 47–70, 97.

Viva Zapata (Aug. 1998), MB Daily, (3 pp.).

Mountain Bike Rider, (Dec. 1997), p. 16, The Burrows Project Bike.

1993 Cannondale Catalogue.

FIG 2A
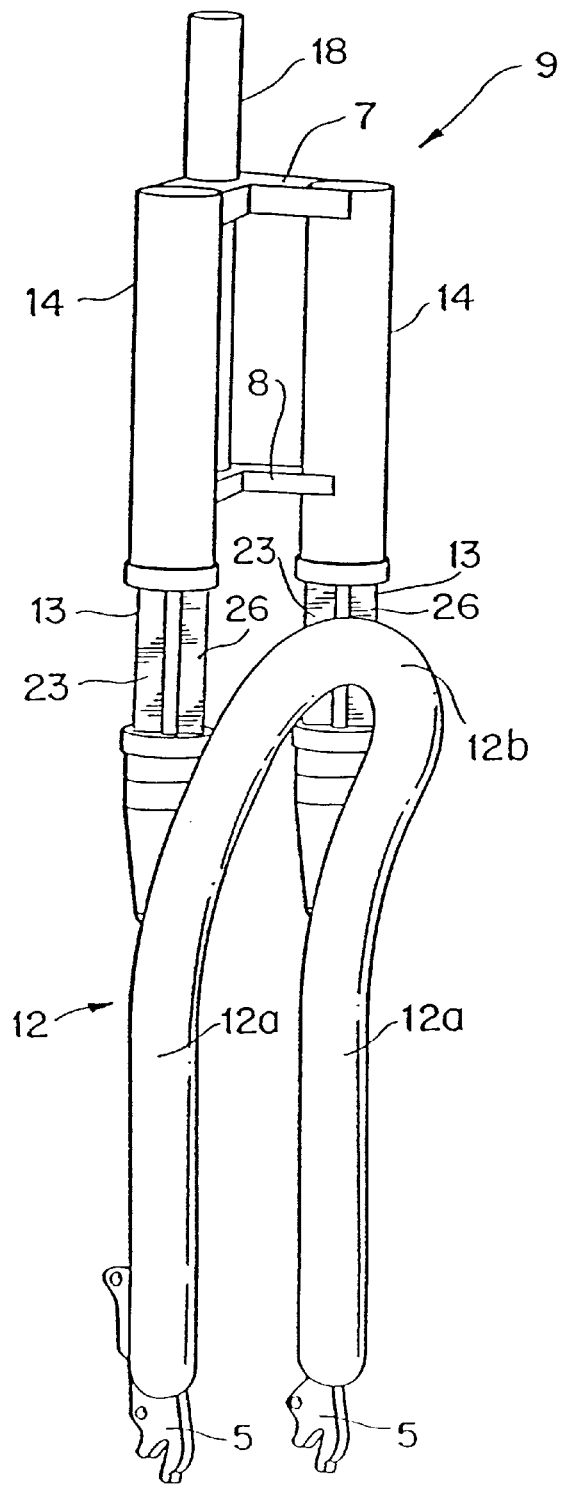
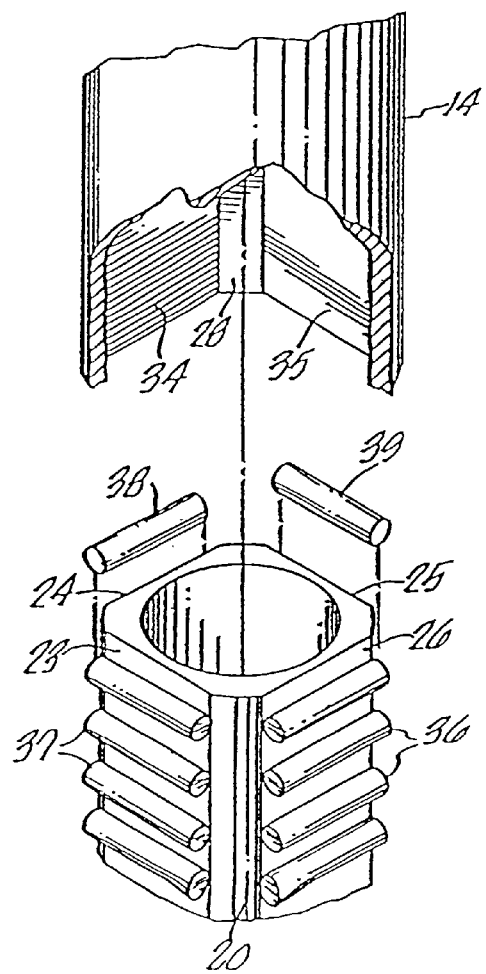
FIG 2B

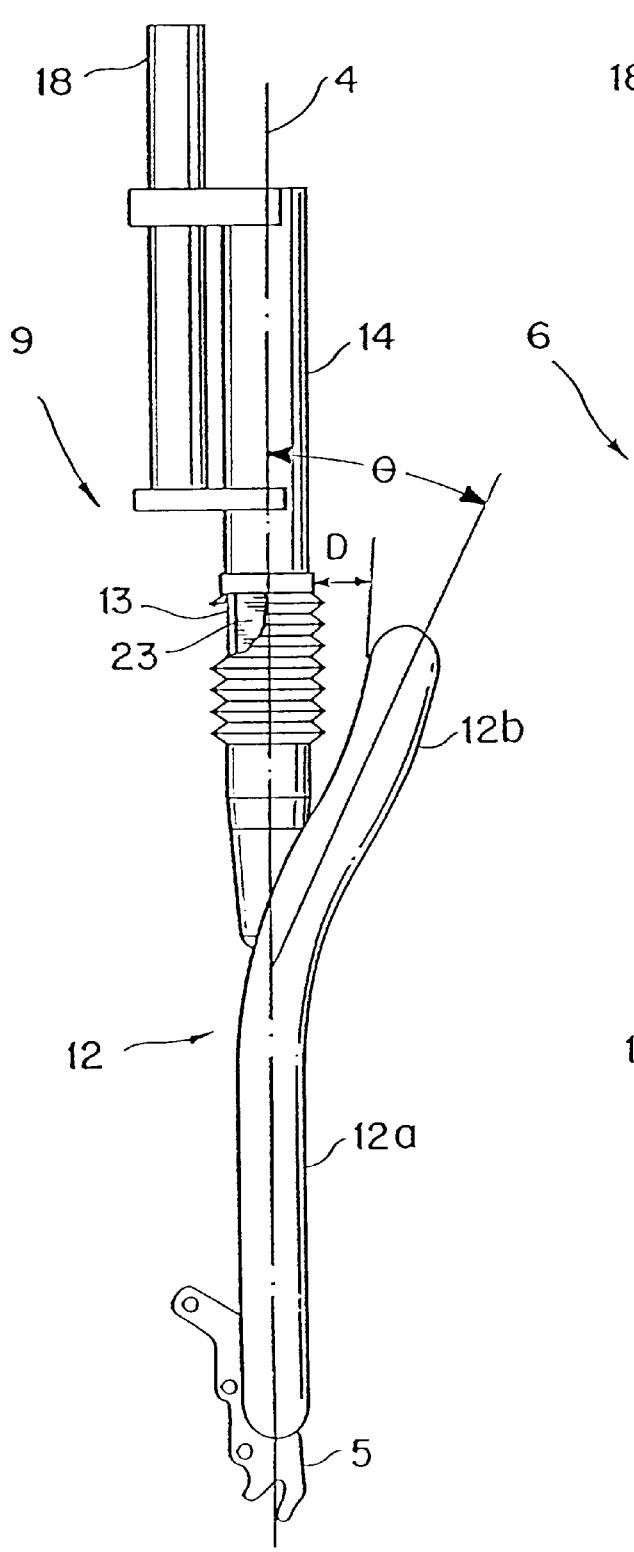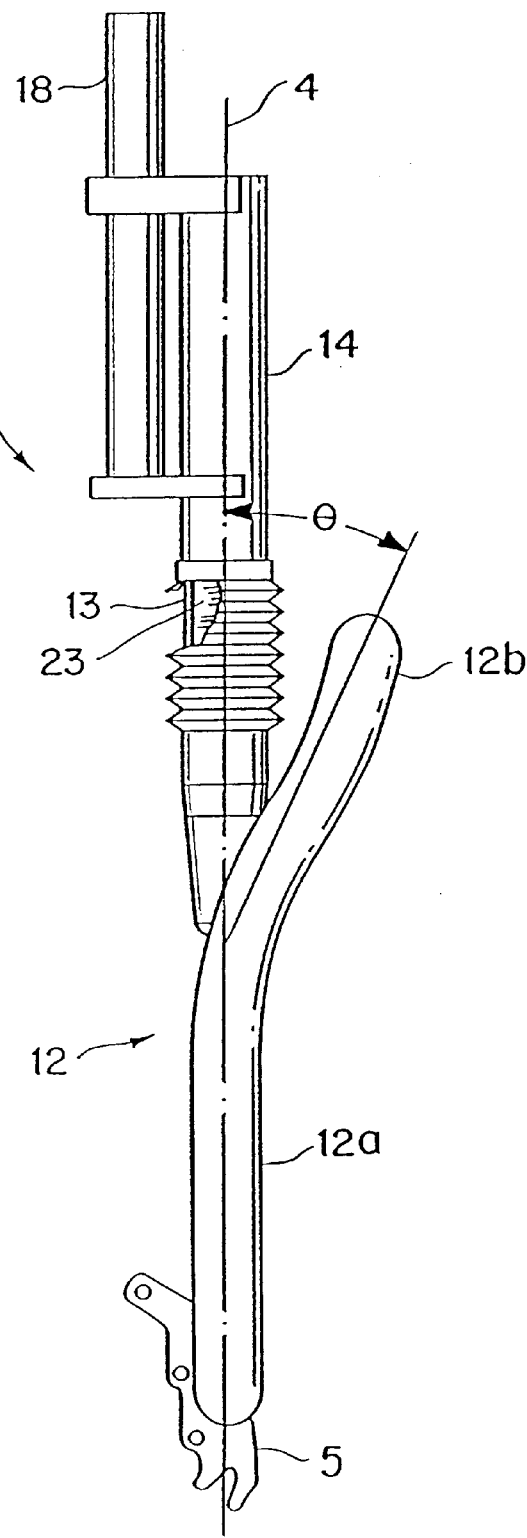
FIG 2C                    FIG 3C

FIG 3A
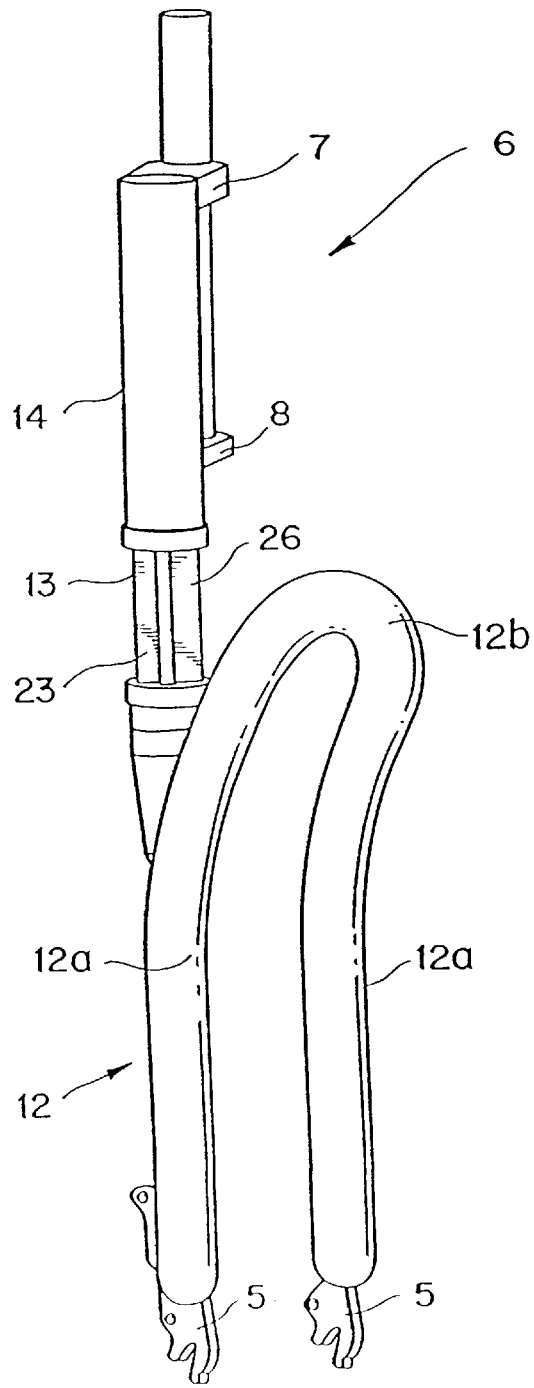
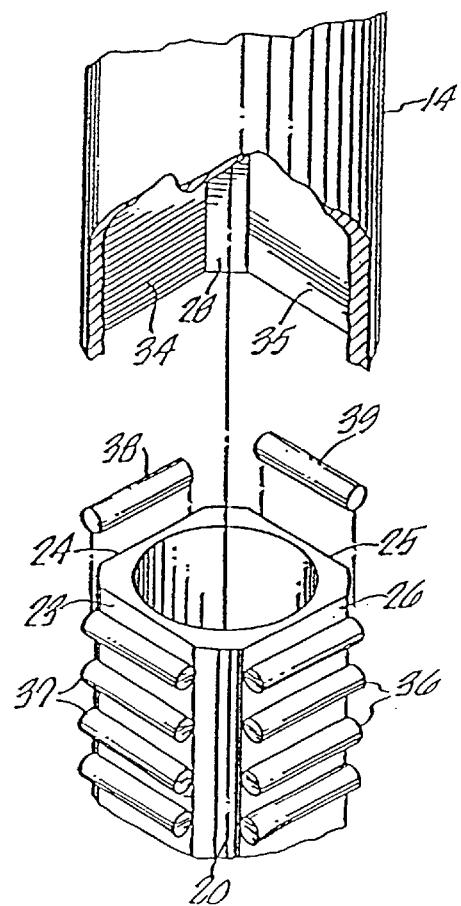
FIG 3B

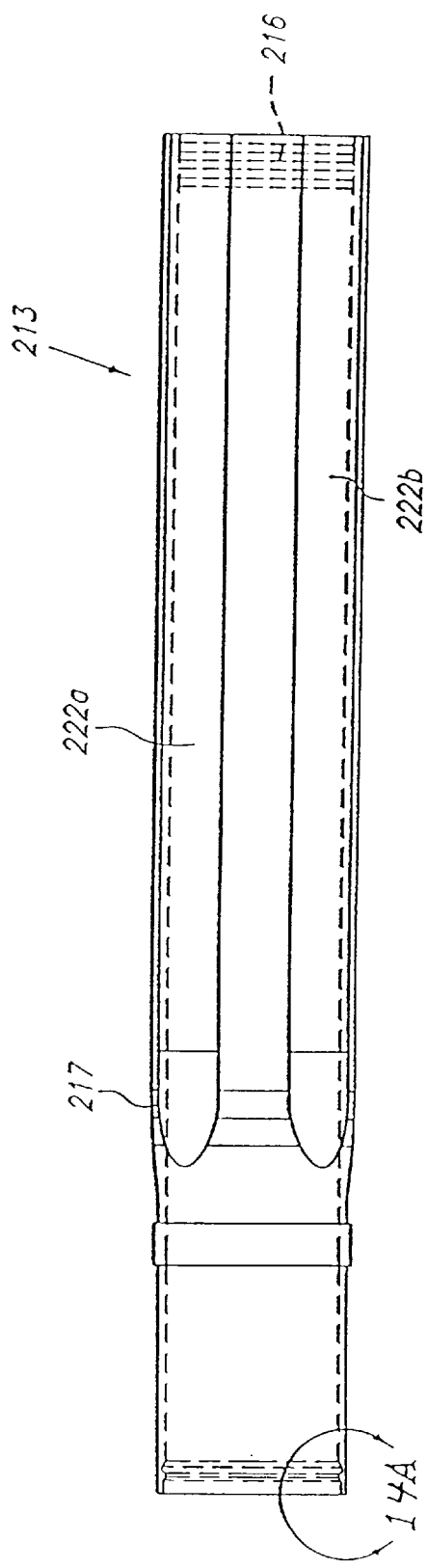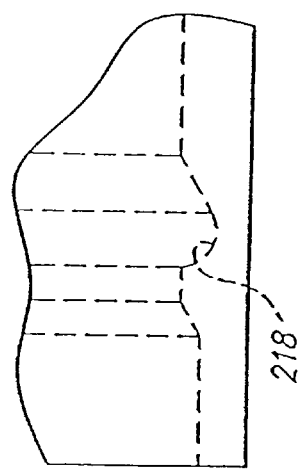
FIG 14
FIG 14A

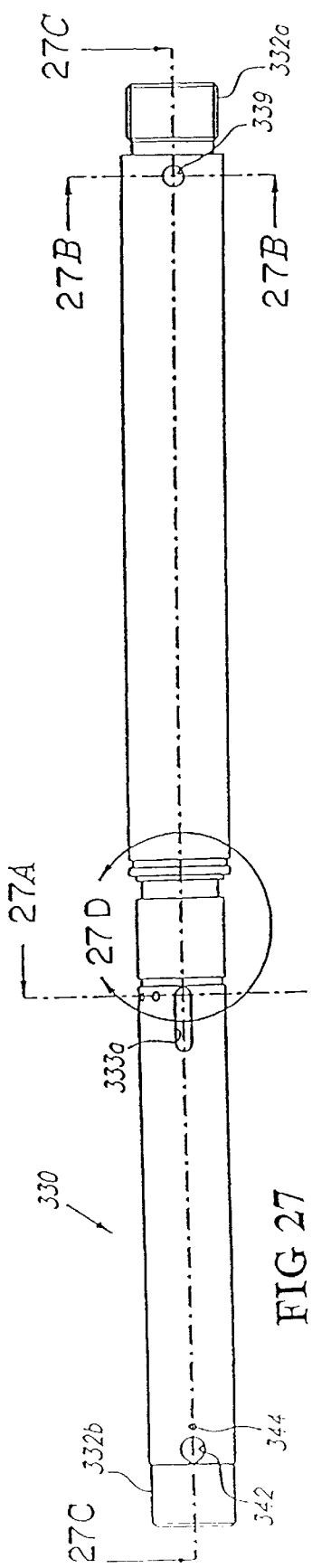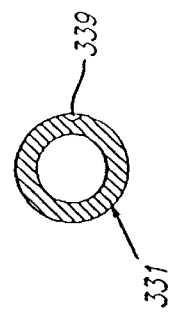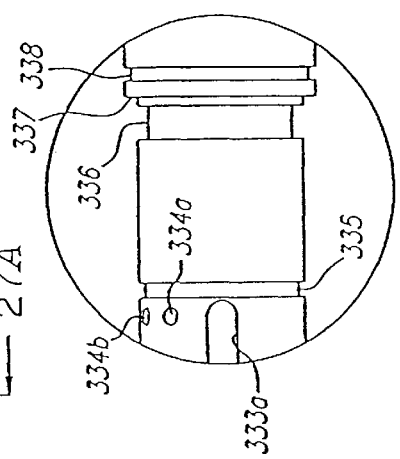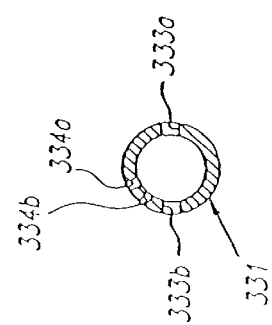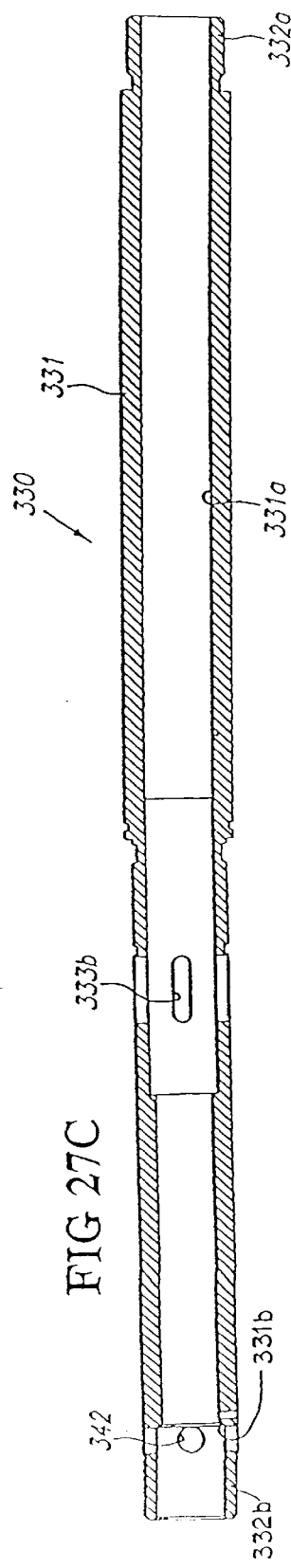

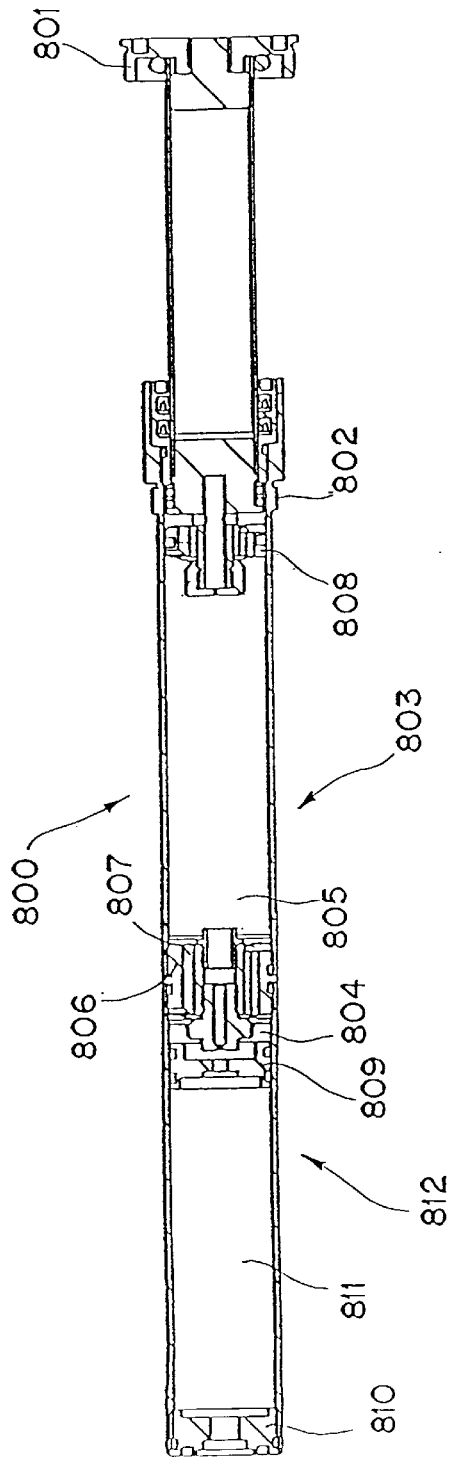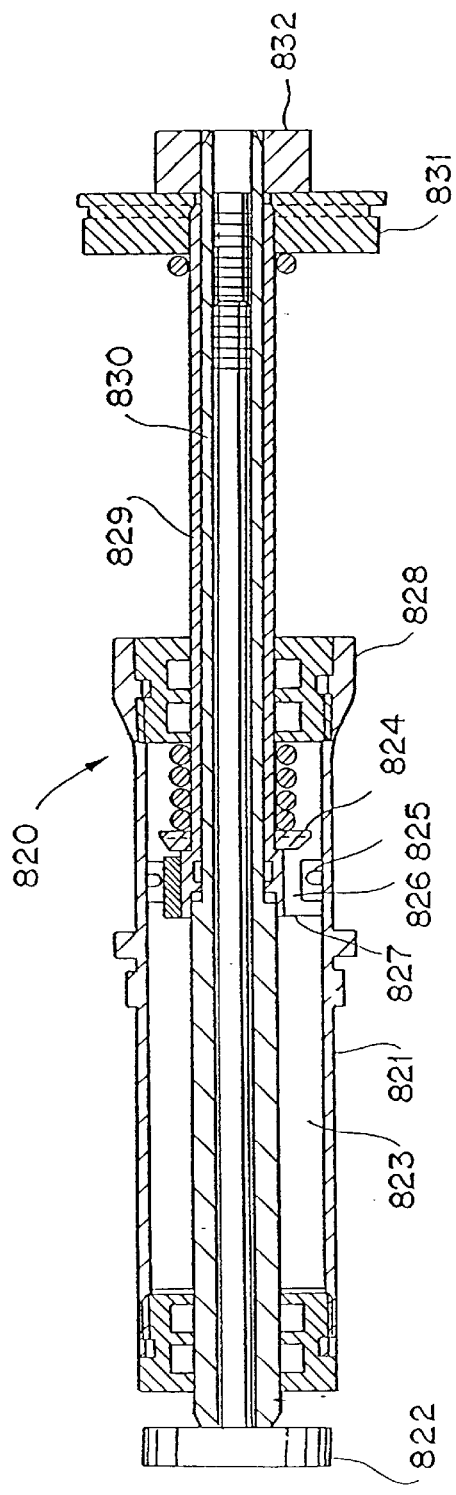
FIG. 36
FIG. 37

BICYCLE SUSPENSION SYSTEM

This application is a divisional of U.S. patent application Ser. No. 08/715,536, filed Sep. 18, 1996, now U.S. Pat. No. 5,924,714 which is a continuation-in-part of U.S. patent application Ser. No. 08/584,922, filed Jan. 11, 1996, now U.S. Pat. No. 5,702,092, which is a divisional of U.S. patent application Ser. No. 08/037,949, filed Mar. 26, 1993, now U.S. Pat. No. 5,494,302, which is a continuation-in-part of U.S. patent application Ser. No. 07/713,673, filed Jun. 11, 1991, now U.S. Pat. No. 5,320,374. The entire disclosure of the prior applications is considered as being part of the disclosure of the instant application and is hereby incorporated by reference herein.

FIELD OF THE INVENTION

The field of the present invention relates to suspension systems and more particularly to a suspension assembly for a vehicle such as a bicycle.

BACKGROUND OF THE INVENTION

Various forms of suspension systems have been proposed and developed for bicycles. The most common form of fork suspension system for bicycles is comprised of suspension forks. These systems include two telescoping assemblies mounted to the front wheel of the bike. The telescoping assemblies include a large diameter tube and a small diameter tube that reciprocates within the large tube. Either of these tubes can be connected to the wheel, but it is usually the large tube. A top bracket bridges the telescoping assembly and the steering tube extends from the top bracket into the head tube. The maximum clearance for this type of system is the distance between the wheel and the top bracket. To increase clearance, the head tube must be raised.

Another type of suspension system commonly found on downhill bicycles is similar to that used on motorcycles and comprises a pair of telescoping assemblies between which the front wheel is mounted. Each telescoping assembly comprises an outer tube, and an inner tube which is free to move in and out of the outer tube and is cushioned in some manner. Generally, the outer tubes are connected at the lower ends to the axle of the front wheel of the bicycle, and the upper ends of the inner tubes are connected together by a pair of brackets that extend forwardly from the steering tube and head tube. These systems generally incorporate an oversized or large diameter axle to provide stiffness between the forks. Of course, such axles also require special hubs, which makes them use specific.

Other bicycle suspension arrangements comprise a single telescoping assembly in the head tube of the bike. In this type of suspension system, the front forks are formed by an integral blade. A inner tube extends from the blade into an outer tube that is mounted in the bike's head tube. This type of system provides a rigid blade system for more control, but the suspension travel is limited by the length and height of the head tube.

In all of these suspensions, bushings are usually provided between the telescoping tubes to reduce friction.

Riders have found that suspension front forks can benefit handling and improve control, and a front suspension helps the front wheel follow the ground. A front suspension system is desirable for absorbing bumps, and can enable the bicycle to handle better at higher speeds and be more controllable under rough conditions. The dual telescoping assembly presently used on some bicycles is essentially an adaptation of motorcycle front suspension technology; however, the two telescoping assemblies also have to be fixed together in some manner, as through a "U" shaped yoke at the upper ends of the tubes to eliminate the attendant twisting problem that occurs with each telescoping assembly. Moreover, the round inner tube and round outer tube that are generally used do not restrict rotational movement well. Also for increased stiffness, these systems generally require bulky forks. This problem does not occur with motorcycles because the suspension fork assembly can be large and bulky so as to overcome the twisting and independent leg motion problems. Additionally, there are linkage type systems, such as the aircraft landing gear scissors link, but this involves an additional coupling with its attendant weight, size and complexity.

Several prior art examples of front suspension systems for bicycles are shown in Horack U.S. Pat. No. 689,970 and Moulton U.S. Pat. No. 3,208,767. The Horack System provides a spring suspension, and includes a ball bearing system for allowing both an axial telescoping action and a rotary steering action. The Moulton patent discloses a spline-type spring suspension. Other suspension systems of interest are shown in Thoms Pat. No. 723,075, Hutchins No. 2,477,748, Ryan No. 3,301,575, Hornsby No. 3,459,441, Zenser No. 3,964,765, Hartman No. 4,815,763, Browning No. 5,308,099, British Specification No. 295316 of November 1928, and Italian Patent No. 416,260 of November 1946.

As is known to those skilled in the art, any form of system using anti-friction bushings and the like have undesirable static friction called "stiction." Because of this, suspension systems using such bushings tend to stick and then suddenly release or move, and the point at which they release gets higher with higher loads (e.g., a higher radial load caused by a braking load).

It is desirable to provide a front suspension system or suspension fork for bicycles, and particularly for lightweight bicycles, which can bear a combination of loads comprising very high radial loads (e.g., from front to back) occasioned by braking, bumps and the like, while at the same time providing stable and tight rotational motion in steering of the front wheel through the suspension system from the handlebars. It is further desirable to provide a suspension system that provides maximum suspension travel.

SUMMARY OF THE INVENTION

The present invention provides an improved form of suspension system in the form of a suspension fork assembly for bicycles. The suspension system is comprised of two reciprocating tubes. In a first embodiment, the assembly comprises first and second steer tubes, one fitting and telescoping within the other, with one being coupled at an upper end to a handlebar stem of the bicycle, and the lower end of the other being coupled to the unitary front blade bicycle fork which receives the front wheel of the bicycle. These elongated inner and outer tubes are mounted in the head tube of the frame of the bicycle, and include a shock absorbing system within these tubes such as an oil-filled spring dampened internal shock absorbing element or system. The system also includes an improved shock absorbing system which is in the form of a cartridge cylinder which may be readily inserted within the telescoping assembly. The cartridge cylinder in the first embodiment is comprised of spring element, such as an air spring, and a damping element, such a hydraulic damper arranges in series.

Of particular importance are axially extending longitudinal flat sections or "flats" which are provided on opposing surfaces between the two tubes, along with a plurality of free floating needle bearings disposed on these flat sections to all but eliminate stiction. For example in the first embodiment, the upper tube is an outer steer tube coupled to the handlebar stem, and the inside surface of this tube has a plurality, preferably four, of longitudinal flat sections provided therein. The lower tube has a like plurality of similar flat sections on the outer surface thereof, and a plurality of needle bearings are arranged normal to the longitudinal axis of these tubes and suitably supported, so that the lower, inner tube can freely telescope in and out of the upper tube to provide the shock absorbing action. In addition to providing minimum friction between the two tubes, the flats and plurality of needle bearings serve to maintain a fixed circumferential relationship between the two tubes. In other words, the flats and needle bearings prevent relative rotation between the two tubes. Thus, in the first embodiment, there is a fixed relationship between the handlebars, fork and wheel, and the reciprocating tubes function to transmit the torsional or rotary steering action from the handle bars to the fork and front wheel. The unitary blade front fork serves to provide a still further rotational stiffness to the system.

While some arrangements have been proposed in the past using a plurality of ball bearings between inner and outer members of a suspension system, it has been found that the use of races with ball bearings is not satisfactory for carrying the various radial and torsional loads that occur. Moreover, costs of manufacture may be high due to the difficulties in achieving the desired fit and preload.

Also presented is a second embodiment of the present invention in which there are two outer tubes secured to the steering tube via a top bracket and a bottom bracket similar to the downhill or motorcycle type suspension systems. Unlike the downhill type suspensions though, the second embodiment is comprised of a unitary front blade for attaching the front wheel to, like in the first embodiment. Inner tubes are fixed to the front blade and fit into the outer tubes. Again, flats on the inner and outer tubes and needle bearings therebetween prevent relative rotational movement between the tubes. Also, the unitary front blade provides additional torsional and bending stiffness not found in other suspension systems. In this embodiment, it is preferred to have two cartridges for fitting into the suspension system. Most preferably, one cartridge is comprised of a spring element, such as an air spring and the other cartridge is comprised of a damping element, such as a hydraulic damper. This creates a suspension system where the spring and damping elements are in parallel, which provide significantly greater travel for the suspension system.

Still further, a third embodiment of the present invention is comprised of only one outer tube secured to the steering tube via a top bracket and a bottom bracket similar to the downhill or motorcycle type suspension systems. The third embodiment is also comprised of a unitary front blade for attaching the front wheel to and an inner tube is fixed to the front blade and fits into the outer tube. Again, flats on the inner and outer tube and needle bearings therebetween prevent relative rotational movement between the tubes. Also, the unitary front blade provides additional torsional and bending stiffness. A spring and damping cartridge similar to that used in the first embodiment can be used in this system as well.

Accordingly, an object of the present invention is to provide an improved suspension assembly or components thereof. Certain of the embodiments may also provide one or more of the following objects:

Provide a new form of telescoping suspension assembly for a steerable member such as a fork.

Provide a new form of suspension assembly for bicycles and/or motorcycles.

Provide a bicycle fork suspension assembly which uses a plurality of needle bearings disposed between flat surfaces of mating telescoping tubes.

Provide a bicycle fork suspension assembly which uses a plurality of needle bearings disposed between flat surfaces of mating telescoping tubes and a unitary tubular fork to restrict rotational movement between telescoping tubes.

Provide a suspension assembly and assembly method which may be economically manufactured.

Provide an improved shock absorbing system for a suspension assembly which is adjustable and highly reliable, and which provides high performance.

Provide an improved shock absorbing system for a suspension assembly which is in a cartridge cylinder form that may be readily inserted within the telescoping assembly.

These and other objects and features of the present invention will become better understood through a consideration of the following description taken in conjunction with the drawings which follow.

BRIEF DESCRIPTION OF THE DRAWINGS

FIG. 2A is a perspective view illustrating a second preferred form of suspension fork according to the present invention;

FIG. 2B is a blown up view of a portion of the suspension system of FIG. 2A.

FIG. 2C is a side view illustrating the second preferred form of suspension fork according to the present invention;

FIG. 3A is a perspective view illustrating a third preferred form of suspension fork according to the present invention;

FIG. 3B is a blown up view of a portion of the suspension system of FIG. 3A.

FIG. 3C is a side view illustrating the third preferred form of suspension fork according to the present invention;

FIG. 14 is a side elevation view showing details of the inner tube portion of the suspension assembly FIG. 13;

FIG. 14A is a detailed view of the end portion of the inner tube of FIG. 14;

FIG. 27 is a top plan view of the piston shaft of FIG. 23;

FIG. 27A is a cross-sectional view of FIG. 27 taken along the line 27A—27A;

FIG. 27B is a cross-sectional view of the piston shaft of FIG. 27 taken along the line 27B—27B;

FIG. 27C is a cross-sectional view of the piston shaft of FIG. 27 taken along the line 27C—27C;

FIG. 27D is a detailed view of a portion of the piston shaft of FIG. 27;

FIG. 36 is a cross-sectional view of an alternate shock absorber cartridge; and

FIG. 37 is a cross-sectional view of an alternate shock absorber cartridge; and

DETAILED DESCRIPTION OF THE PREFERRED EMBODIMENTS

Figure 1A:
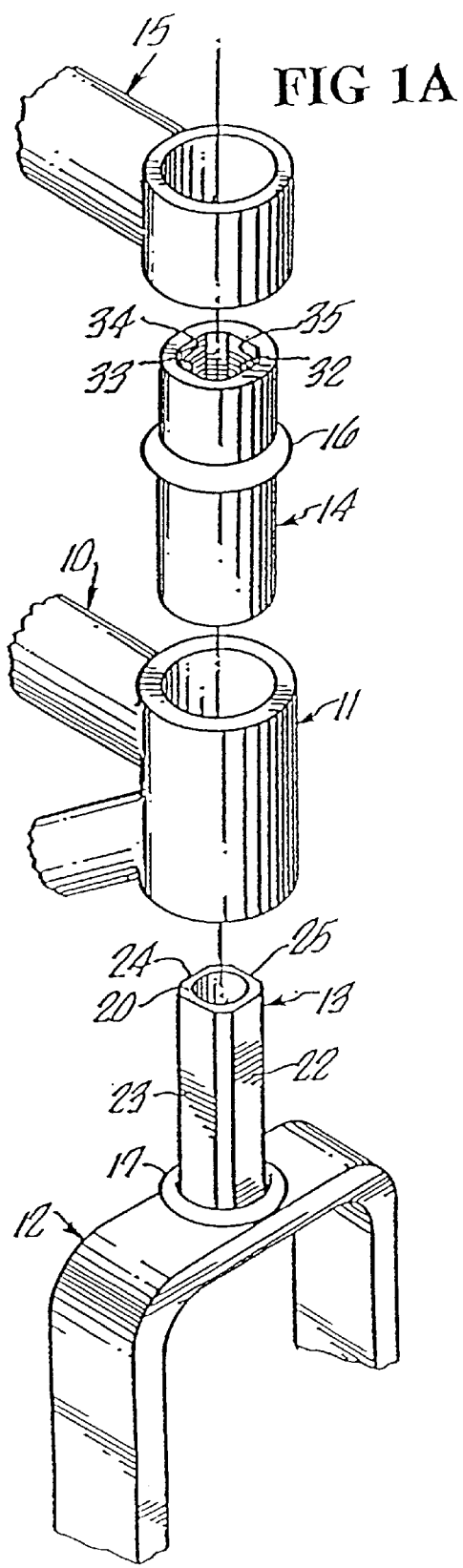
FIG. 1A is a simplified exploded perspective view illustrating a preferred form of suspension fork according to the present invention.
Figure 1B:
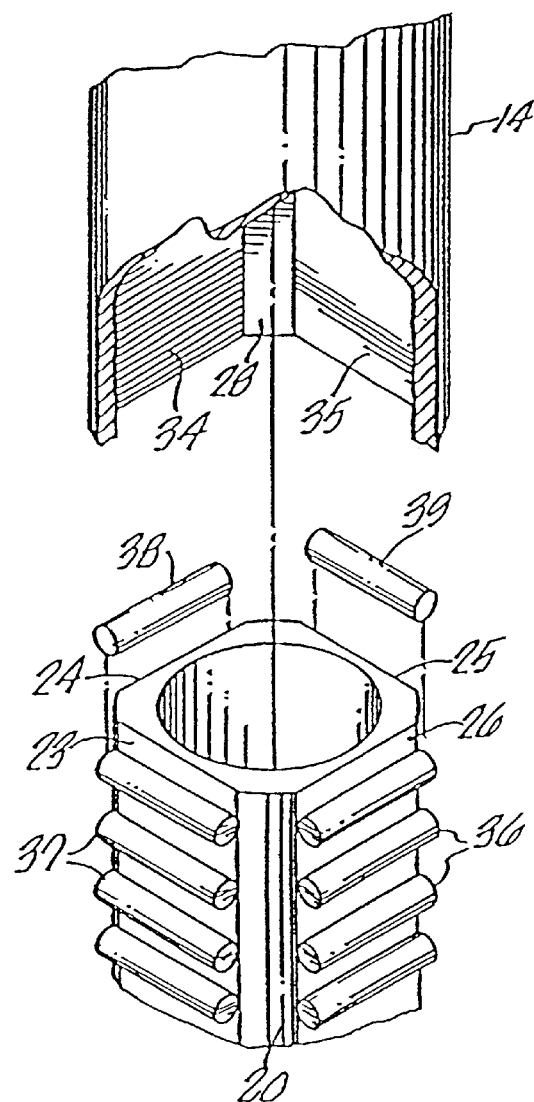
FIG. 1B is a blown up view of a portion of the suspension system of FIG. 1A.

Turning now to the drawings, and first to FIGS. 1A and 1B, a bicycle frame 10 is shown (partial) along with a head tube 11. A fork or front blade 12 has an inner steer tube 13 affixed thereto and which extends upwardly through the head tube 11 into an upper outer steer tube 14. The unitary front fork 12 is used couple the front wheel (not shown) to the handle bars and is tubular to provide torsional and bending stiffness. The upper end of the outer steer tube 14 is connected to a handlebar stem 15 to which handlebars (not shown) are attached. Upper and lower bearings 16 and 17 can be provided to journal the tube assembly 13–14 within the head tube 11 for steering rotation. The assembly of the tubes 13 and 14 is suitably connected together and retained within the head tube 11, and a suitable hydraulic or air shock system is mounted within these tubes 13–14, all as will become apparent subsequently.

The outer wall 20 of the lower or inner steer tube 13 has a plurality of axially extending longitudinal flat surfaces or "flats" 22–25. Preferably four such flats are provided, although three will suffice and a greater number than four can be used. The inner wall 28 of the upper or outer tube 14 has a like set of opposing flats 32–35. These flats on both tubes extend in the axial directions of the tubes. Four sets of needle bearings 36–39 are disposed between the respective flats of the inner and outer tubes 13–14, as generally illustrated in FIG. 1B. The needle bearings are disposed normal or perpendicular to the axial direction of the tubes 13 and 14, or consequently normal to a radial line extending from the center of the tubes. These needle bearings, which are disposed from the top to the bottom of each flat, are preferably retained in a suitable cage (not shown in FIG. 1B) which will be described later.

It will be apparent to those skilled in the art that the needle bearings 36–39 allow the inner tube 13 to freely slide axially or telescope with respect to the outer tube 14. Additionally, the needle bearings, in conjunction with the associated flats on the tubes 13 and 14, enable the steering torsional or rotary action to be imparted from handlebars connected to the handlebar stem 15 via the telescoping tubes 13 and 14 to the fork 12 and consequently to the front wheel (not shown) supported by the fork. The respective flats and needle bearings bear a combination of loads including very high radial loads from the fork 12 during movement over rough terrain and during braking and the like, while still stabilizing a rotational and torsional connection from the handlebars to the fork. No external coupling or linkage is needed to enable transmission of the rotational and torsional forces for steering, and the present suspension assembly can be made sufficiently strong, light and compact such that a single telescoping assembly can be provided for a bicycle fork without requiring a pair of telescoping assemblies. Moreover, the tubular structure of the front fork 12 provides significantly greater bending a torsional stiffness than telescoping forks. Sufficient longitudinal or axial travel can be provided, such as several centimeters. The length of the flats establishes the extent of telescoping action of the tubes. This assembly absorbs bumps, facilitates handling the bicycle while riding, is more controllable over rough conditions, and provides a tight positive steering action.

A second embodiment of a suspension system 9 according to the present invention is shown in FIGS. 2A–2C. This system is particularly useful for downhill bicycles and motorcycles. The suspension 9 is comprised of two outer tubes 14 that are secured to a steering tube 18. The steering tube 18 is rotatably secured to the head tube (not shown) of the bicycle. A top bracket 7 and a bottom bracket 8 are used to secure the outer tubes 14 to the steering tube 18. The suspension is further comprised of a unitary front fork 12 for attaching the bicycle front wheel to. Inner tubes 13 are fixed to the front fork 12 and fit into the outer tubes 14. A plurality of flats 23–26 on the outer surface 20 of the inner tube 13, a plurality of flats 32–35 on the inner surface 28 of the outer tube 14 and sets of needle bearings 36–39 disposed therebetween prevent relative rotational movement between the tubes 13 and 14. The unitary front fork 12 is tubular to provide torsional and bending stiffness. As will be discussed in more detail below, in this embodiment, it is preferred to have two suspension cartridges for fitting into the suspension system. Most preferably, one cartridge is disposed in one of the inner tubes 13 and outer tubes 14 and contains a spring element therein, such as an air spring. In the other outer tube 14 and inner tube 13 is another cartridge incorporating a damping element, such as a hydraulic damper. This creates a suspension system where the spring and damping elements are in parallel, which provides significantly greater travel for the suspension system.

Referring to FIG. 2C, the fork 12 is configured and attached to the inner tube 13 such that the axis 4 of the inner and outer tubes 13 and 14 will intersect or approximately intersect the attachment point for the front wheel, i.e., the axle brackets 5. In order to accomplish this, the fork 12 is comprised of a lower end 12a and an upper end or bridge section 12b and the upper end 12b is forwardly offset from the lower end 12a. The lower end of the inner tube 13 is secured to the upper end 12b of the front fork 12 very near the lower end 12a, or approximately half way down the front fork 12. In the preferred embodiment, the fork upper end 12b is bent forward by an angle Θ from the axis 4 of the lower end 12a and the inner and outer tubes 13 and 14. The angle Θ is preferably about 15 to 45 degrees and, most preferably, about 22 degrees. Thus, the upper end 12b is forwardly disposed from the lower end and of the outer tubes 14 by a distance D and can clear the outer tubes 14 and the bottom bracket 8, which enables the suspension system 9 to have greater travel.

Referring to FIGS. 3A–3C, a third embodiment of a suspension system 6 according to the present invention is similar to the second embodiment, but is comprised of only one outer tube 14 secured to a bicycle steering tube 18 via a top bracket 7 and a bottom bracket 8. The suspension system 6 is also comprised of a unitary front fork 12 for attaching the front wheel (not shown) to and an inner tube 13 is fixed to the front fork 12 and fits into the outer tube 14. Again as shown in FIG. 3B, flats 23–26 are provided on the inner tube 13 and corresponding flats 32–35 are provided on the outer tube 14 to receive a plurality of needle bearing sets 36–39 therebetween to prevent relative rotational movement between the tubes 13 and 14. Also, the unitary front blade 12 is tubular to provide additional torsional and bending stiffness between the bicycle wheel and frame. A spring and damping cartridge similar to that used in the first embodiment is preferred in this system.

Figure 4:
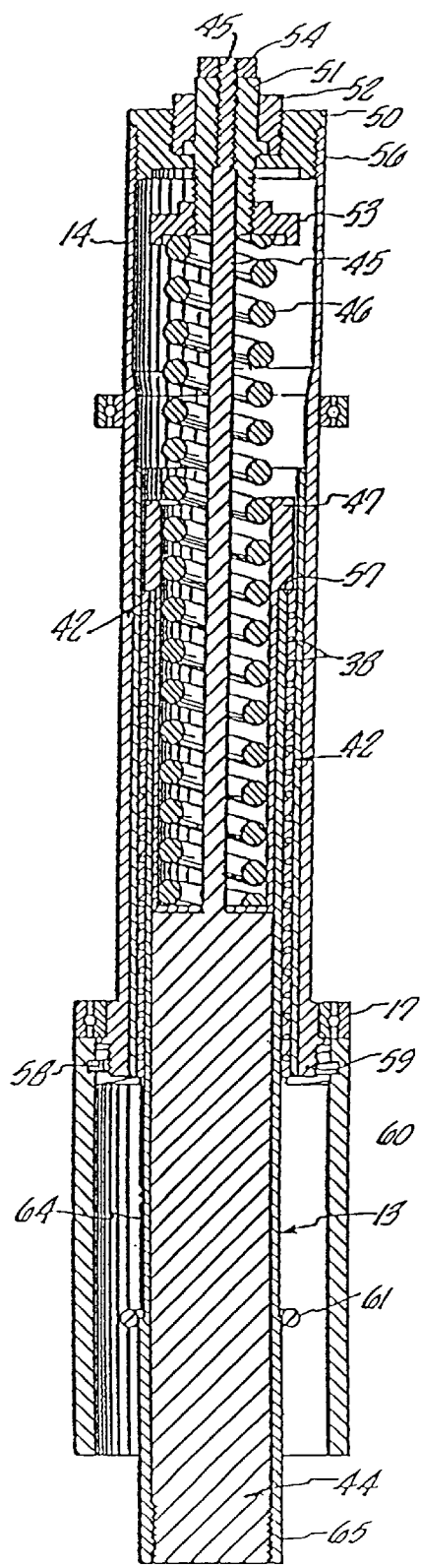
FIG. 4 is a detailed assembly drawing of an embodiment of the present invention, illustrating inner and outer steer tubes and sets of needle bearings arranged therebetween.
Figure 5B:
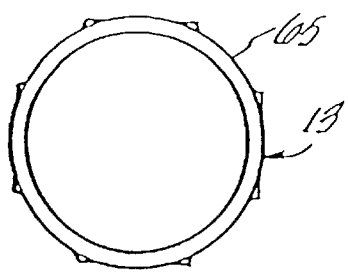
FIG. 5A is a view of the inner steer tube of the assembly of FIG. 4, and FIGS. 5B and 5C are respective end views thereof.
Figure 5A:
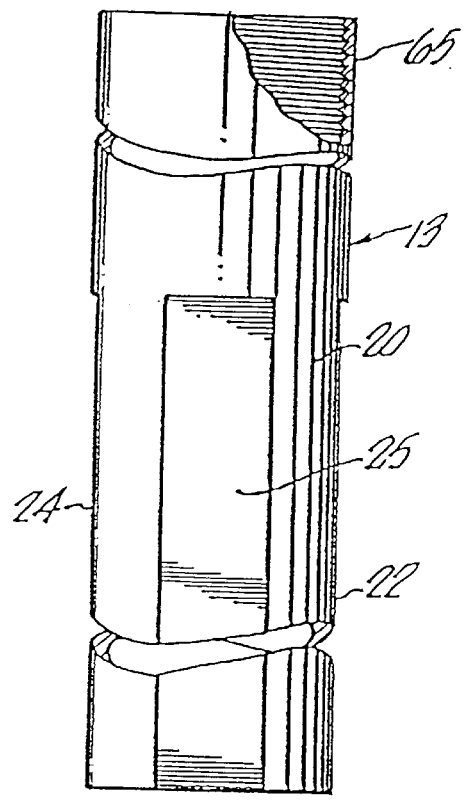
Figure 5C:
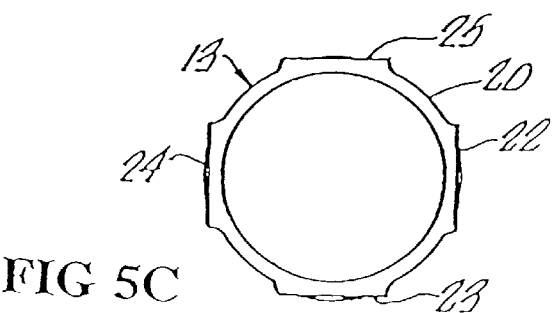

Turning now to a detailed discussion of an exemplary embodiment of a suspension system according to the present invention, FIGS. 4 through 9 illustrate the details of a preferred construction. FIG. 4 is a cross-sectional view of the entire assembly, and FIGS. 5 through 9 illustrate major components thereof in further detail. FIG. 4 illustrates the inner tube 13 disposed coaxially within the outer tube 14, and shows two sets 36 and 38 of the four sets (36–39) of needle bearings disposed between these tubes. The upper and lower bearings 16 and 17 also are shown coupled to the tube 14 in FIG. 4, and these bearings support the suspension fork assembly within the head tube 11 of FIG. 1 in a conventional manner. For the suspension systems in FIGS. 2–3, there are no bearings since the outer tube 14 is rigidly connected to the brackets 7 and 8. FIG. 5 illustrates the inner tube 13 in detail and FIG. 6 illustrates the outer tube 14 in detail. FIGS. 7A–7D illustrate a bearing cage 42, four of which are used for holding the respective four sets of needle bearings 36–39 between the tubes 13 and 14. FIGS. 8A, 8B, 9A and 9B illustrate respective fixed and adjustable bearing races which are mounted within the outer tube 14 and inner tube 13 as will be discussed in more detail subsequently. The bearing reaces, such as those in FIGS. 8A and 8B are preferably used to create an interference fit for the sets of needle bearings between the inner and outer tubes.

FIG. 4 also illustrates diagrammatically a hydraulic assembly 44 having a shock carriage assembly 45 and associated coil spring 46 and spring sleeve 47. The hydraulic assembly 44 includes a typical piston and valving arrangement (not shown) to provide an adjustable hydraulic shock action between the tubes 13 and 14.

The upper end (to the right as viewed in FIG. 4) of the outer steer tube 14 is threaded as illustrated for receiving an outer tube cap 50 which in turn receives a jack screw 51 held therein by a retainer screw 52. The lower end (to the left in FIG. 4) of the jack screw 51 has a collar 53 threaded thereon and engages an end of the spring 46. The upper end of the shock carriage 45 is threaded into the jack screw 51 and is secured by a nut 54. Although not shown in FIG. 4, the handlebar stem 15 of FIG. 1 is clamped around the upper end 56 of the outer tube 14. In the suspensions systems in FIGS. 2–3, the handlebar stem is secured to the steering tube 18. The jack screw 51 and associated components are adjustable so as to allow the preload of the hydraulic shock assembly to be adjusted, such as to adjust the same for the rider's weight.

The needle bearing cages 42 and needle bearings 36–39 can be retained between the tubes 13 and 14 in any suitable manner. In the exemplary embodiment illustrated in FIG. 4, the upper end of the spring sleeve 47 includes a shoulder 57 against which the upper end of the bearing cages 42 abut, and the lower ends thereof are retained by a lower collar 58 which is threaded onto the lower end 59 of the outer tube 14. A boot 60 may be attached to the collar 58, and a bottom-out bumper 61 can be provided on the inner tube 13, as shown. The boot minimizes collection of dirt and moisture on the lower exposed portion 64 of the tube 13. The lower end 65 of the inner tube 13 is secured to the fork 12 of FIGS. 1–3 in any suitable manner as will be apparent to those skilled in the art.

FIG. 5 illustrates in detail the configuration of the inner tube 13 and FIG. 6 illustrates in detail the configuration of the outer tube 14. The inner tube 13 is essentially a hollow cylinder as illustrated in FIGS. 4 and 5, but has formed on its outer wall 20 four axially extending longitudinal flat surfaces, or flats, 22 through 25 as previously discussed with reference to FIGS. 1–3. An exemplary outer diameter of the tube 13 is 1.125 inches (28.58 mm) and an exemplary length of the tube 13 is 8.17 inches, with the flats being 5.67 inches (144 mm) long and one-half inch (12.7 mm) wide, and the cylindrical end 62 being 2.5 inches (63. s mm) long. The tube 13 is formed of steel, and can be formed from Nitriloy or equivalent, and with the flats 22–25 being hardened through the use of copper masking techniques as used in the automotive industry. Since this tube 13 is the most highly stressed part of the assembly, it is important that it be formed of a material and in a manner such that it will bend rather than break under high stresses.

Figure 8B:
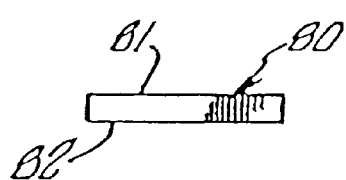
FIGS. 8A and 8B illustrate views of a fixed race used in the assembly of FIG. 4.
Figure 8A:
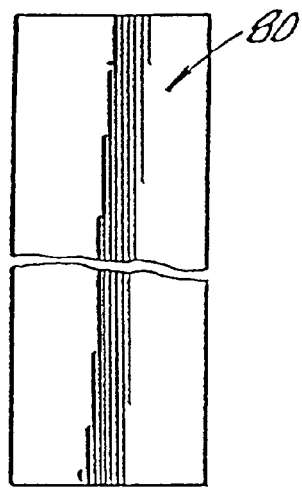
Figure 9B:
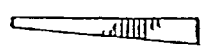
FIGS. 9A and 9B are similar views of an adjustable race used in the assembly shown in FIG. 4.
Figure 9A:
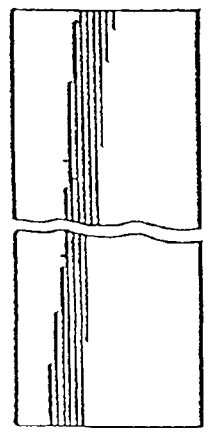

The outer tube 14 as shown in FIG. 6 comprises a hollow cylinder for mounting in the bearings 16 and 17 within the head tube 11 as previously discussed or in the brackets 7 and 8. The inner wall 28 of this tube has formed therein four longitudinally disposed channels 72–75 as seen in FIGS. 6B–6D. These channels are formed to receive therein the bearing races 80 and 84 shown in FIGS. 8A and 8B. The channels 72–25 also have outer walls 72a–b–75a–b (note FIG. 6B) to receive the bearing cages 42. The race 80 shown in FIG. 8 is termed herein a "fixed" race and has a consistent rectangular cross section with parallel sides or faces 81 and 82 as seen in FIG. 8B. Two of these races 80 are disposed in respective channels 73 and 74. On the other hand, each of the longitudinal channels 72 and 75 receives the race 84 of FIGS. 9A, 9B which is termed an "adjustable" race. These adjustable races facilitate assembly and provide a way to adjust bearing clearance after assembly as is explained below. An exemplary length for the tube 14 is 7.66 inches (195 mm) and outer diameter of the central portion is 1.5 inches (38 mm).

Figure 6B:
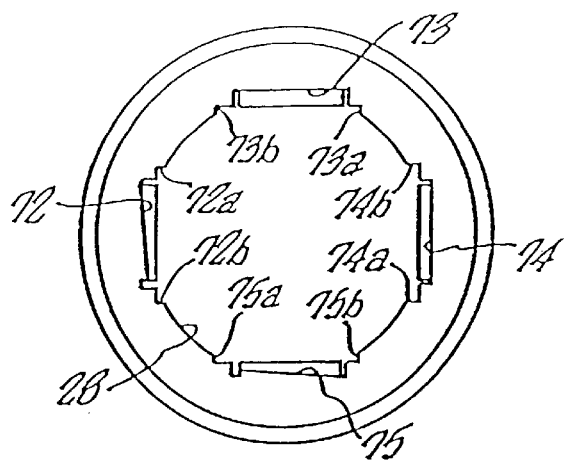
FIG. 6B is an end view and FIGS. 6C–6D are cross-sectional views taken along respective lines 6C—6C and 6D—6D thereof, and these views illustrate an adjustable race arrangement.
Figure 6D:
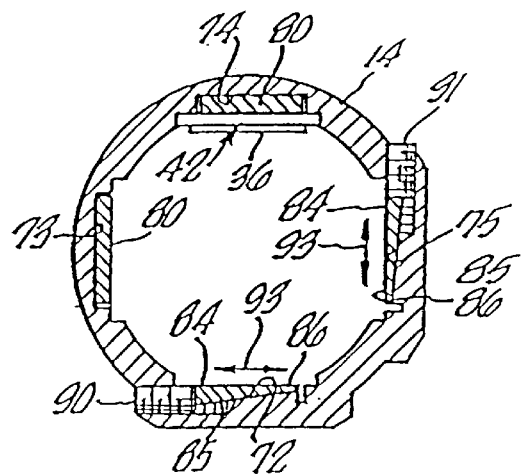
Figure 6A:
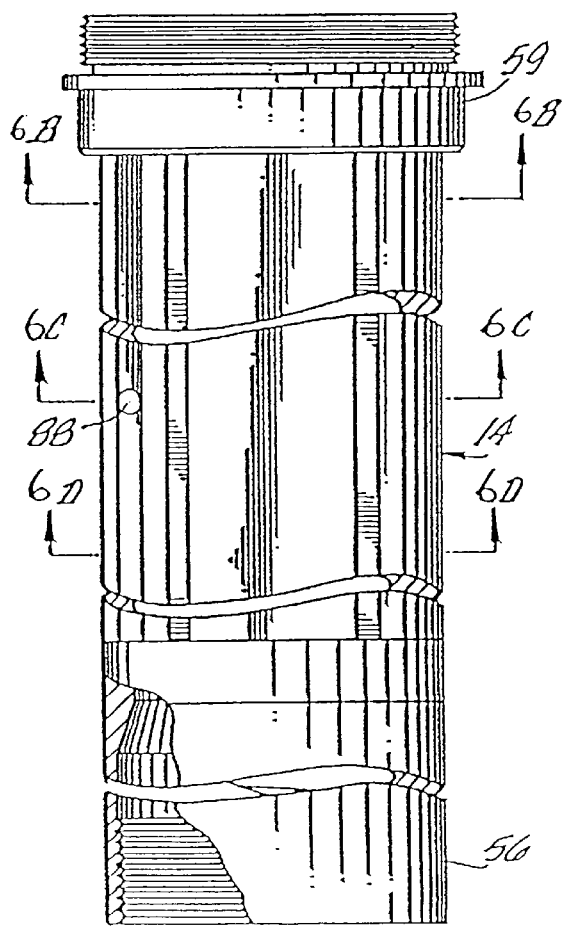
FIG. 6A illustrates the outer steer tube of the assembly of FIG. 4.
Figure 6C:
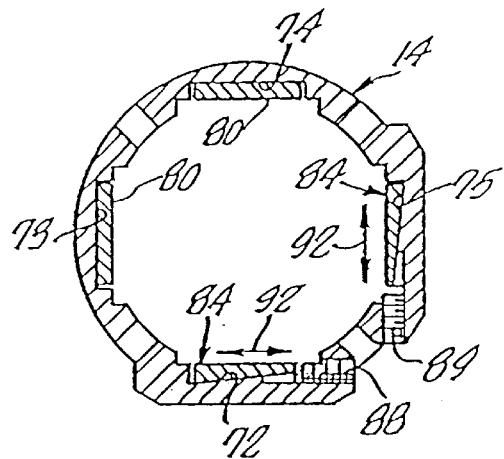

It can be seen in FIGS. 6B–6D that the channels 73 and 74 for the fixed race 80 are not only parallel to the axis of the tube 14 but are perpendicular to a radial line extending through the center of the tube 14.

On the other hand, the channels 72 and 75 can be disposed at a slight angle (e.g., approximately 0–4°) with respect to a normal to a radial line. Furthermore, the adjustable races 84 of FIG. 9 have a similar inclined side or face 85 which mates with the surfaces of the channels 72 and 75 so that the two inclined surfaces (i.e., 72 and 85 and 75 and 85) mate and cooperate to allow radial adjustment of bearing clearance. Note FIGS. 6C and 6D which are cross-sectional views along the lines 6C—6C and 6D—6D of FIG. 6A and illustrate threaded holes 88–91 for receiving set screws (not shown) to allow a small adjustment of the adjustable races 84 in the direction of the arrows 92 and 93 which, as will be apparent to those skilled in the art, causes the inclined surfaces (i.e., 72 and 85 and 75 and 85) to move along one another thereby causing the normal surfaces 86 of the adjustable races to move radially in and out with respect to the axis of the tube 14 so as to take up bearing clearance. The four sets of bearing cages and needle bearings are disposed on the respective races 80 and 84, only one bearing cage 42 being shown in FIG. 6D.

Holes may be provide at suitable locations in the wall of outer tube 14 to serve as grease ports.

Figure 7A:
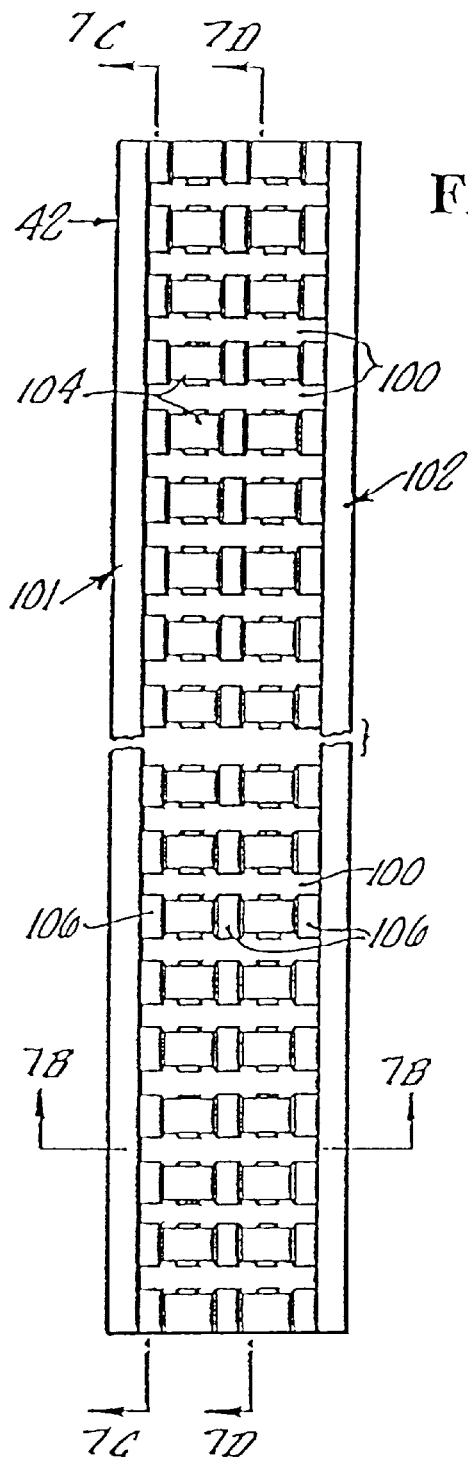
FIG. 7A is a view of a bearing cage of the assembly of FIG. 4, and FIGS. 7B–7D are cross-sectional views taken along respective lines 7B—7B, 7C—7C and 7D—7D thereof.
Figures 7C, 7D:
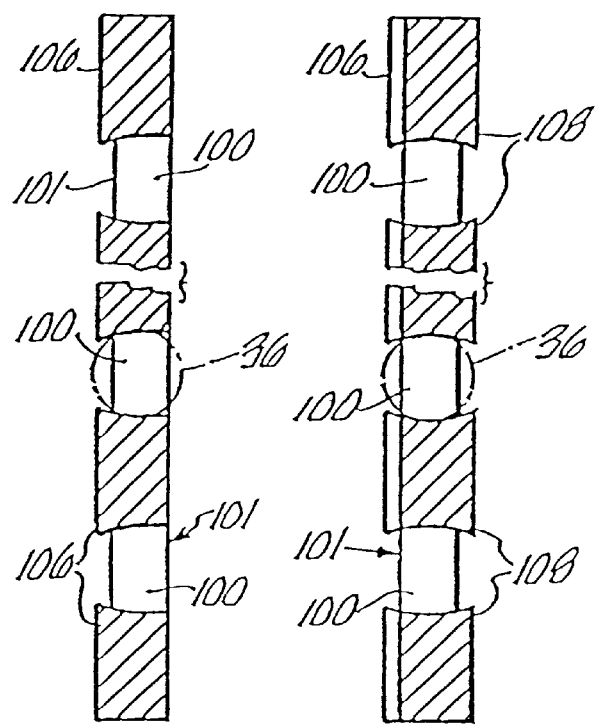
Figure 7B:
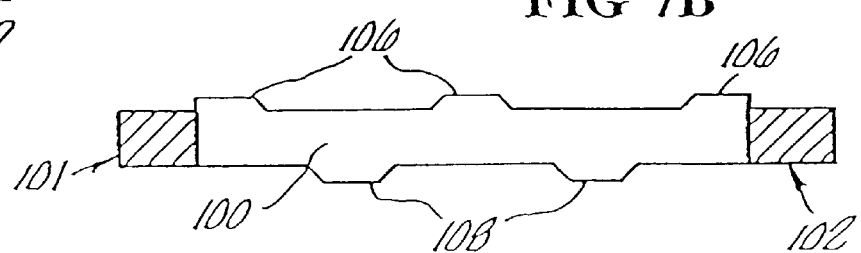

FIG. 7 illustrates the bearing cage 42 that can be used to hold each of the sets of the needle bearings 36–39 between the flats 22–25 of the inner steer tube 13 and the flats provided by the normal surfaces 82 and 86 of the respective races 82 and 84. The bearing cage 42 shown in FIG. 7 may be molded from a suitable thermoplastic material, and has slots 100 for receiving the needle bearings. The cage includes an outer frame structure 101 and 102 and a plurality of cross-members 104 extending therebetween and forming the needle bearing slots or spaces 100. The cross members 104 are configured as best seen in FIG. 7B–7D, and have inwardly curved upper members 106 (FIG. 7C) and inwardly curved lower members 108 (FIG. 7D) for partially encircling the needle bearings and retaining them within the slots 100. In the present exemplary embodiment, each bearing cage 42 supports sixty-six needle bearings in the slots 100.

Figure 10:
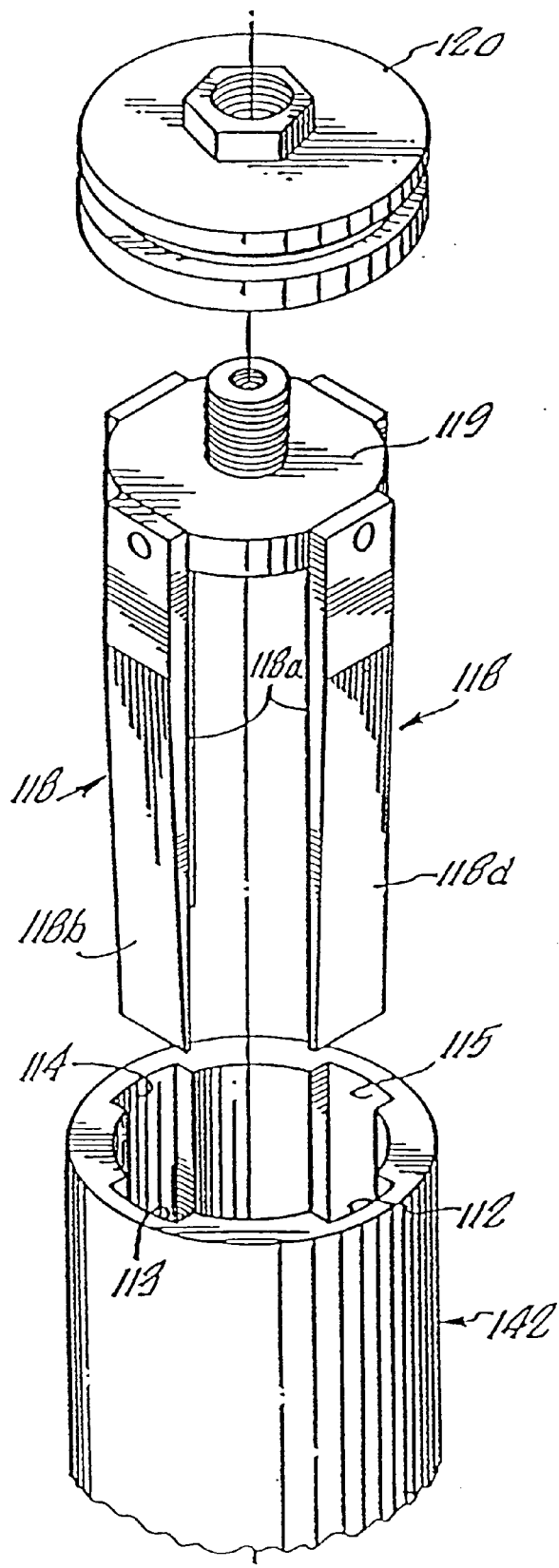
FIG. 10 is a perspective view of an alternative manner for providing an adjustable race for a suspension fork according to the present invention.

FIG. 10 shows an alternative embodiment for adjusting bearing clearance in which an upper end of an outer steer tube 14a has four axially extending longitudinal channels 112 through 115. Four adjustable races 118 are secured to an upper collar 119 which in turn can be adjustably connected to a cap 120. The cap 120 can be similar to the outer tube cap 50 of FIG. 4, and the handlebar stem (not shown) can be attached to the upper end of the tube 14a.

The races 118 shown in FIG. 10 have inwardly facing flat faces 118a which are disposed normal to a radial line from the center axis of the tube 14a. An inner tube (not shown) is disposed within the outer tube 14a, with mating flats, along with suitable needle bearings and bearing cages similar to the structures previously described.

The opposite outer surfaces 118b of at least two of the races 118 are inclined from top to bottom wherein the upper end is thicker than the lower end as shown. Two or more of the channels 112–115 can have a similar mating relationship wherein these channels are inclined outwardly from the bottom to the top of the tube 14a. with this construction, movement of the set of races 118 downwardly into the tube 14a against the inclined channels 112–115 causes the inner normal surfaces 118a of the inclined races to move radially inward to thereby accommodate and adjust for bearing clearance. This arrangement provides another way for adjusting or compensating for bearing clearance and thus involves movement of some or all of races 118 in an axial direction for bearing compensation.

Figure 11:
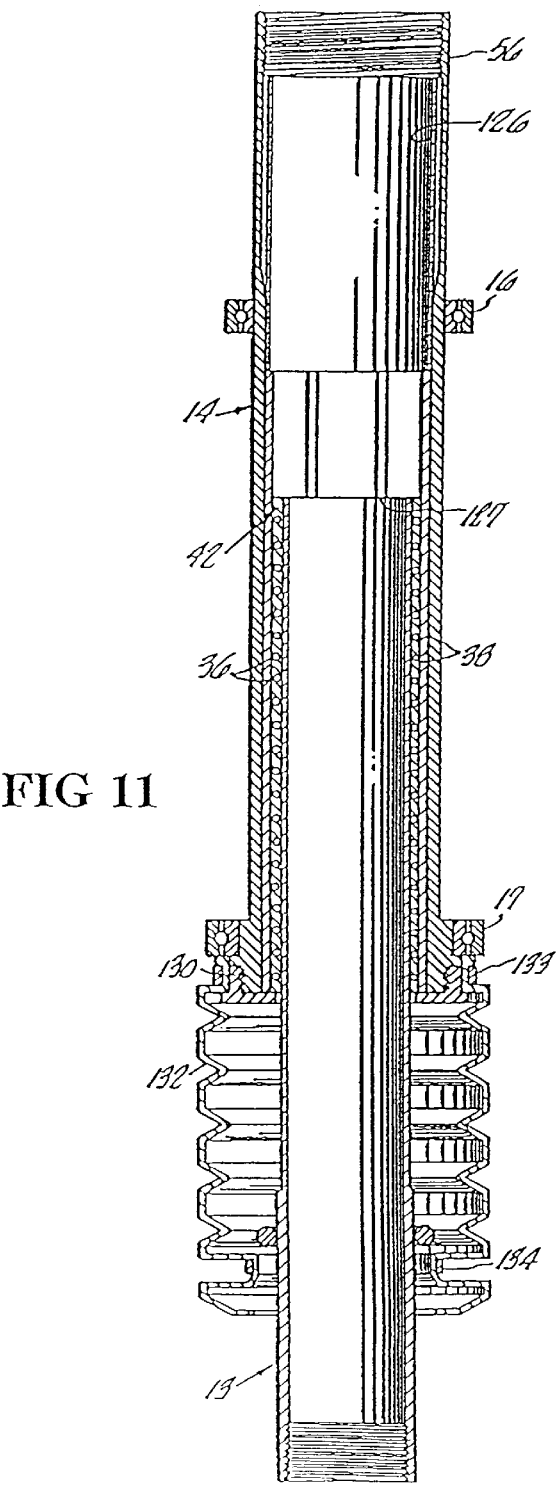
FIG. 11 is a view, similar to FIG. 4, of an alternative suspension assembly which can incorporate an air spring.
Figure 12B:
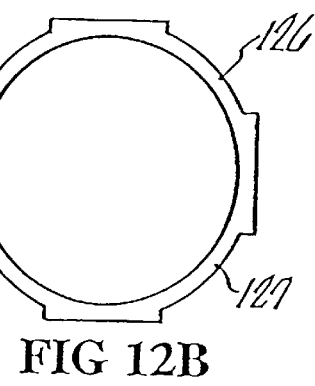
FIG. 12B is an end view thereof, for use in the assembly of FIG. 11.
Figure 12A:
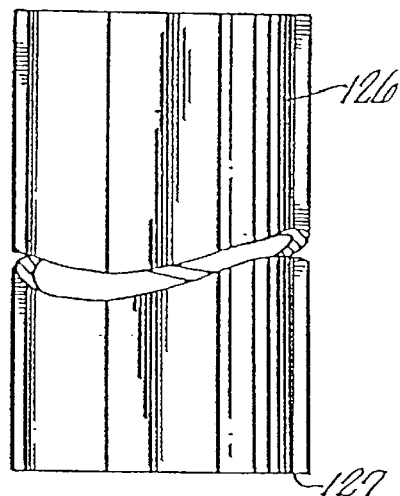
FIG. 12A is a view of a suspension fork race retainer.

FIGS. 11 and 12 illustrate an alternative embodiment which is almost the same as that shown in FIG. 4 but which is designed to accommodate an internal air spring system (not shown). In this embodiment, the inner tube 13 and outer tube 14 are like those shown in FIGS. 1–4. Likewise, the assembly is mounted in bearings 16 and 17 or brackets 7 and 8, and the assembly contains the same four sets of needle bearings 36–39, only two of which 36 and 38 are seen in this Figure. Like bearing cages 42 also are used, but the upper or right hand ends as seen in FIG. 11 are retained by a cylindrical race retainer 126 and which is shown in greater detail in FIG. 12. This race retainer 126 fits within the upper end of the outer tube 14, and has a lower end forming a shoulder 127 against which the upper ends of the bearing cages 42 are retained. The race retainer is retained in the upper end 56 of the tube 14 by a tube cap (not shown) and related components similar to the tube cap 50 of FIG. 4. The lower ends of the bearing cages 42 are retained by a collar 130 similar to the collar 58 of FIG. 4. A boot 132 is provided and is retained by cable ties 133–134.

FIGS. 13–23 illustrate an embodiment and construction method for a preferred suspension assembly. As best shown in the perspective view of FIG. 13, the telescoping assembly 210, which can be used for any of the suspension systems disclosed in FIGS. 1–3 above, is comprised of an inner tube 213 and an outer tube 214 which are coaxially arranged with the inner tube 213 coaxially translating within or telescoping out from the outer tube 214. Similar to previous embodiments, low friction telescoping movement is provided through four rectangular bearing cages (described more fully below with respect to FIGS. 21–23) spaced about the inner tube 213 in the annular space between the outer tube 214 and the inner tube 213.

In order to provide the desired wear and performance qualities, the surfaces on the inner tube 213 and outer tube 214 which are contacted by the bearing cages are preferably hardened or constructed from a sufficiently hard metal material. As shown in FIGS. 14–18, the inner tube 213 includes internal thread 216 on the first end thereof and a groove 218 along an inner surface at the second end thereof (as best shown in FIG. 14A). The inner tube 213 has a central passage 220 of generally circular cross section and four recessed portions or channels 222a, 222b, 222c, 222d which extend axially from the first end at the threads 216 approximately two thirds of the length of the inner tube 213. A respective bearing race 224a–d is installed in each respective recess 22a–d. Each race 224a–d is approximately 0.016 inches (0.41 mm) thick and extends radially outward from the respective recess. Races 224a–d may be attached to the inner tube 213 by small spot welds at extreme ends of the races to fix the race to the inner tube 213 and prevent wandering. The races 224a–d are constructed out of hard material or may have a hard outer surface such as steel which has its outside surface hardened by a nitriding process.

Figure 21:
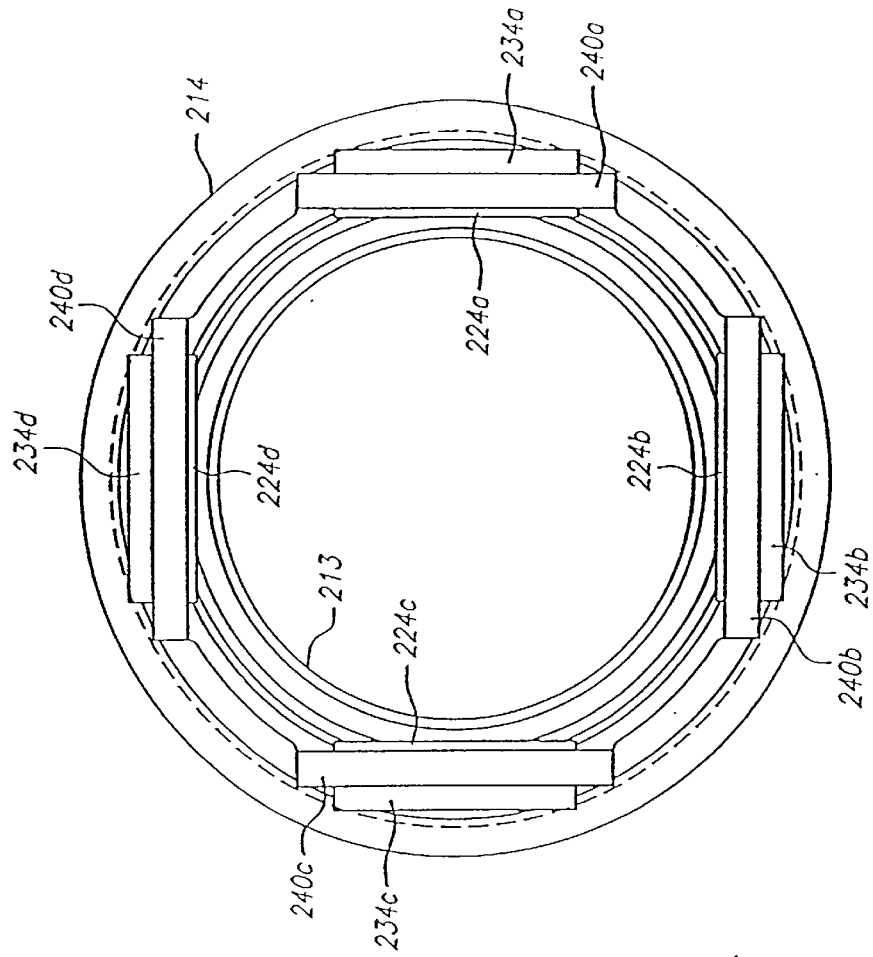
FIG. 21 is a cross-sectional view of the telescoping assembly of FIG. 13 taken along the line 21—21.
Figure 13:
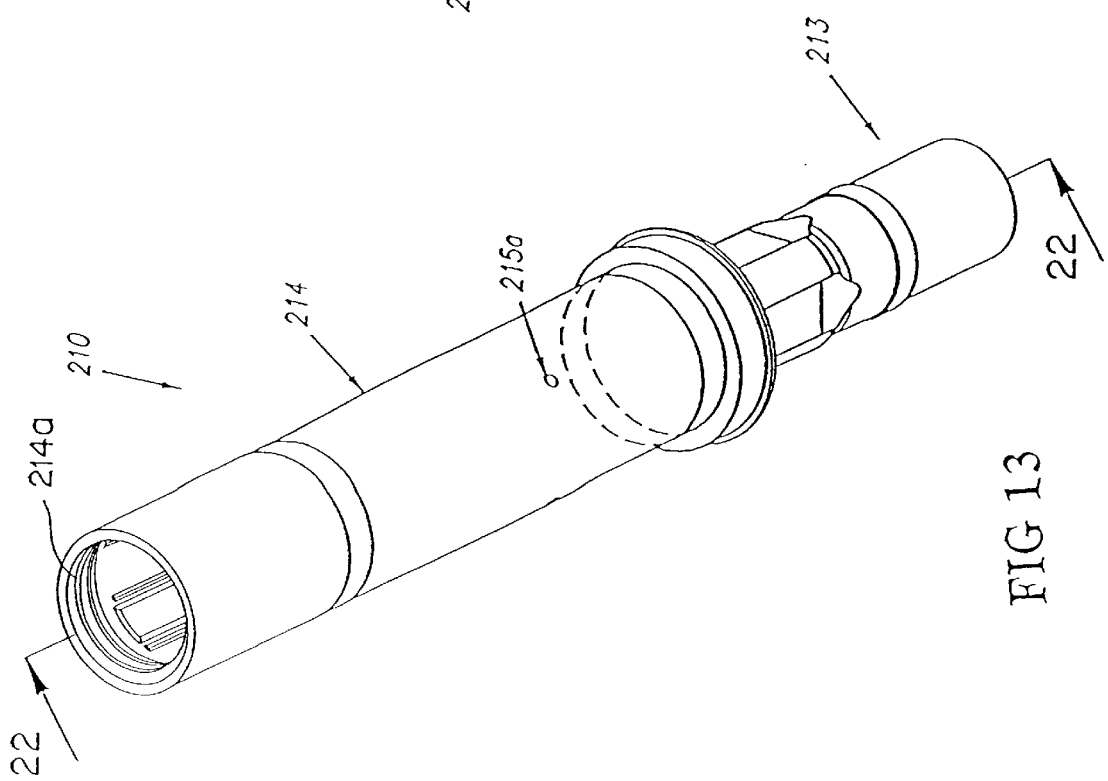
FIG. 13 is a perspective view of an alternative telescoping suspension assembly.
Figure 16:
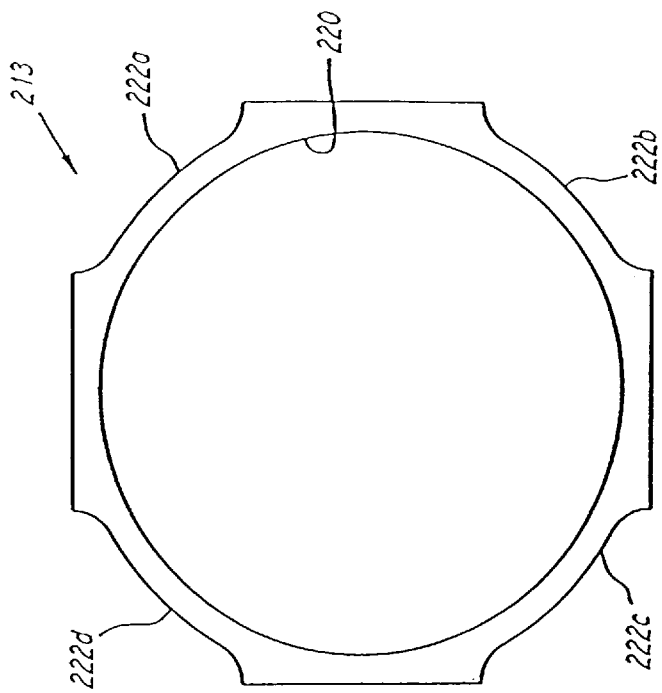
FIG. 16 is a front end view of the inner tube of FIG. 15.
Figure 15:
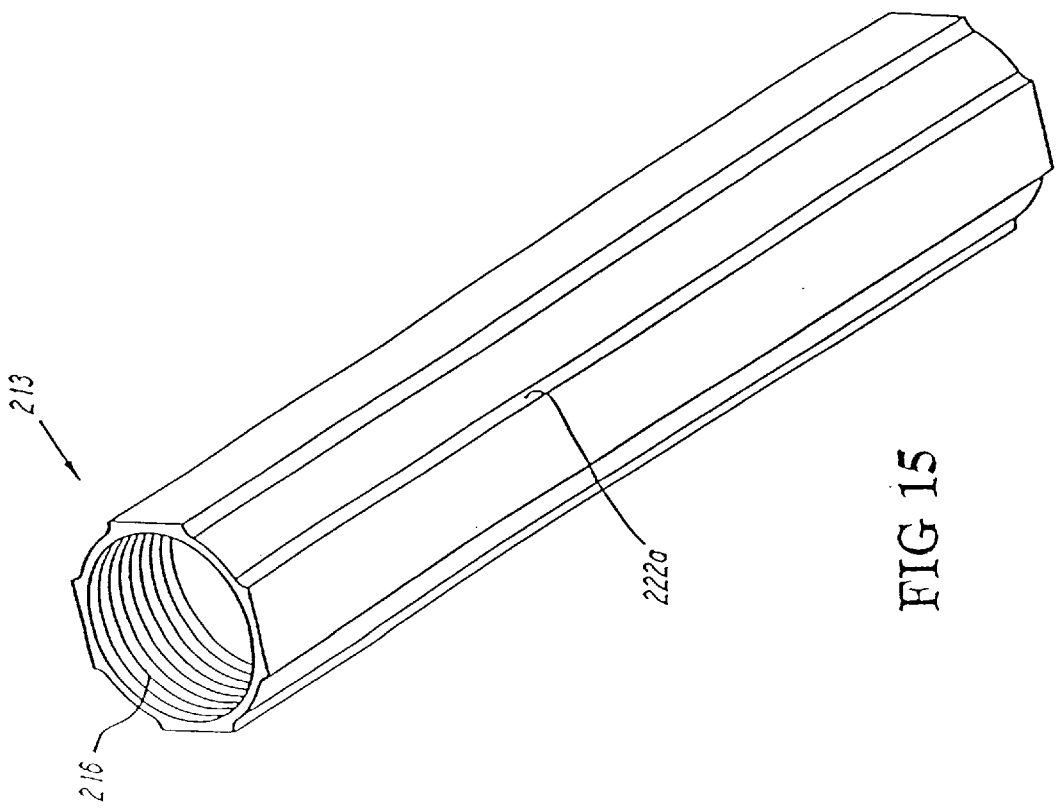
FIG. 15 is a perspective view of the other end portion of the inner tube of FIG. 14.
Figure 18:
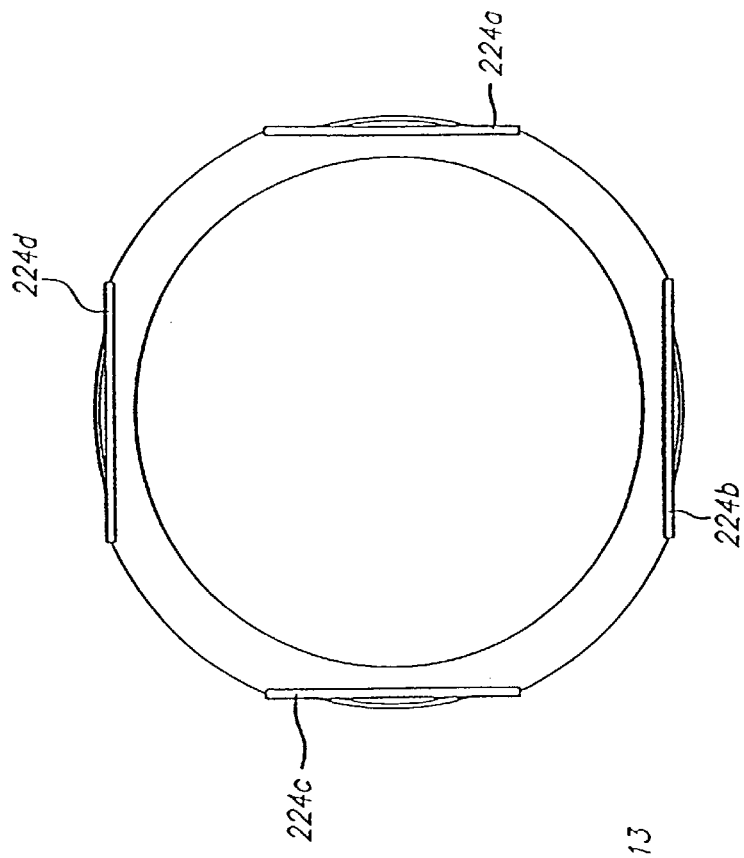
FIG. 18 is a front elevation view of the inner tube of FIG. 17.
Figure 17:
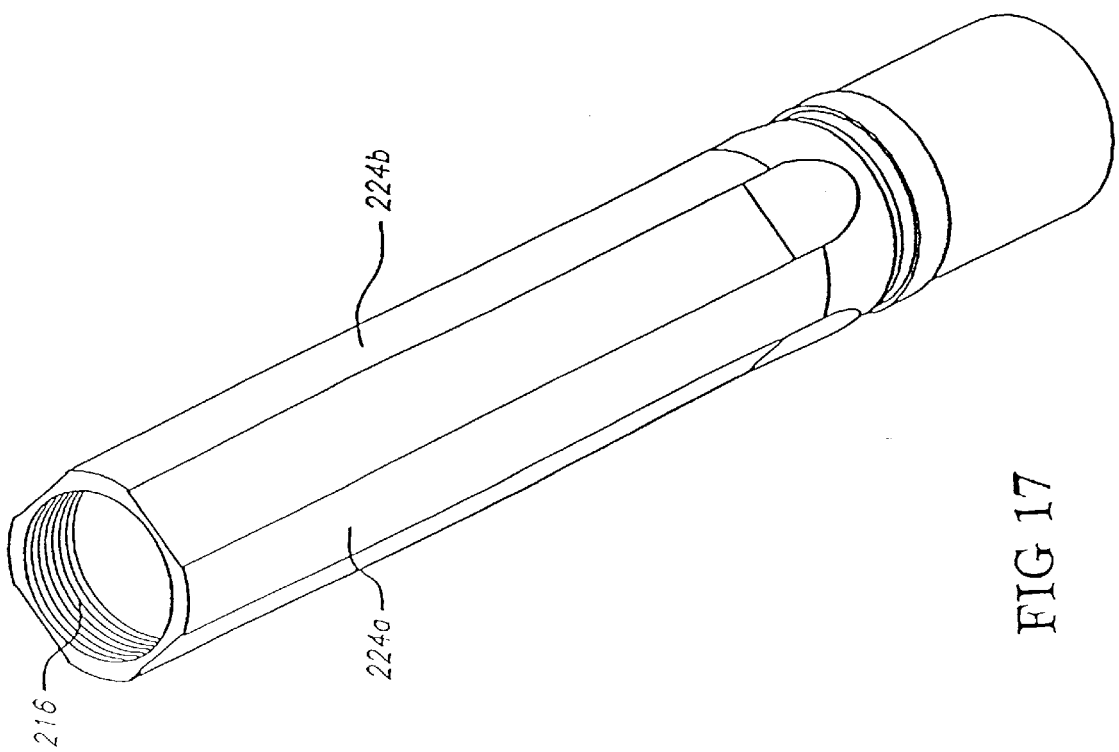
FIG. 17 is a perspective view of the inner tube with races attached.
Figure 19:
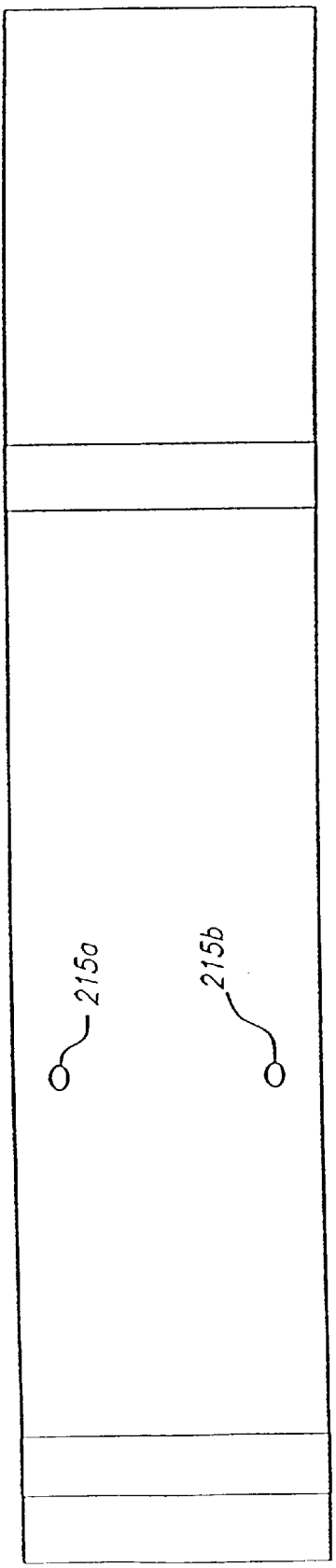
FIG. 19 is a side elevation view of the outer steerer tube of FIG. 13.
Figure 20:
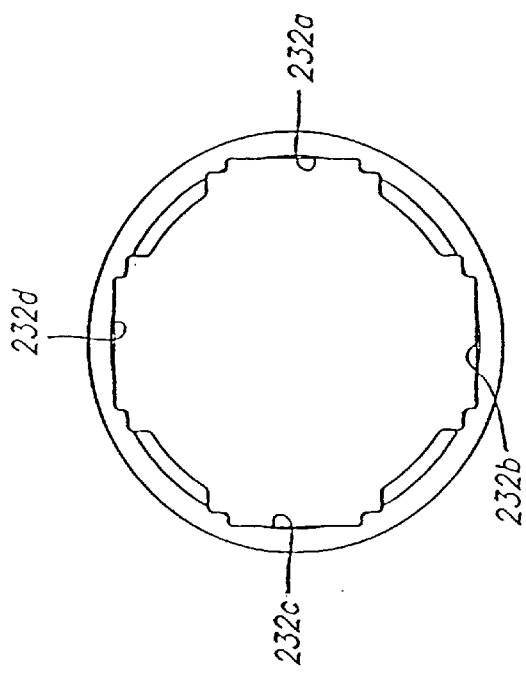
FIG. 20 is a rear plan view of the outer steerer tube of FIG. 19.

Referring to FIGS. 19–21, the outer tube 214 has a plurality of longitudinal inner recesses or channels 232a, 232b, 232c, 232d spaced about its inner periphery and extending the length of the outer tube 214. A respective outer race 234a, 234b, 234c, 234d is installed in each corresponding recess 232a–d in the outer tube 214. A respective bearing cage 240a–d is positioned between respective inner and outer races. As an example, bearing cage 240a is positioned between inner race 224a and outer race 234a. The entire assembly is press fit together with a desired preload on the bearings.

Figure 22:
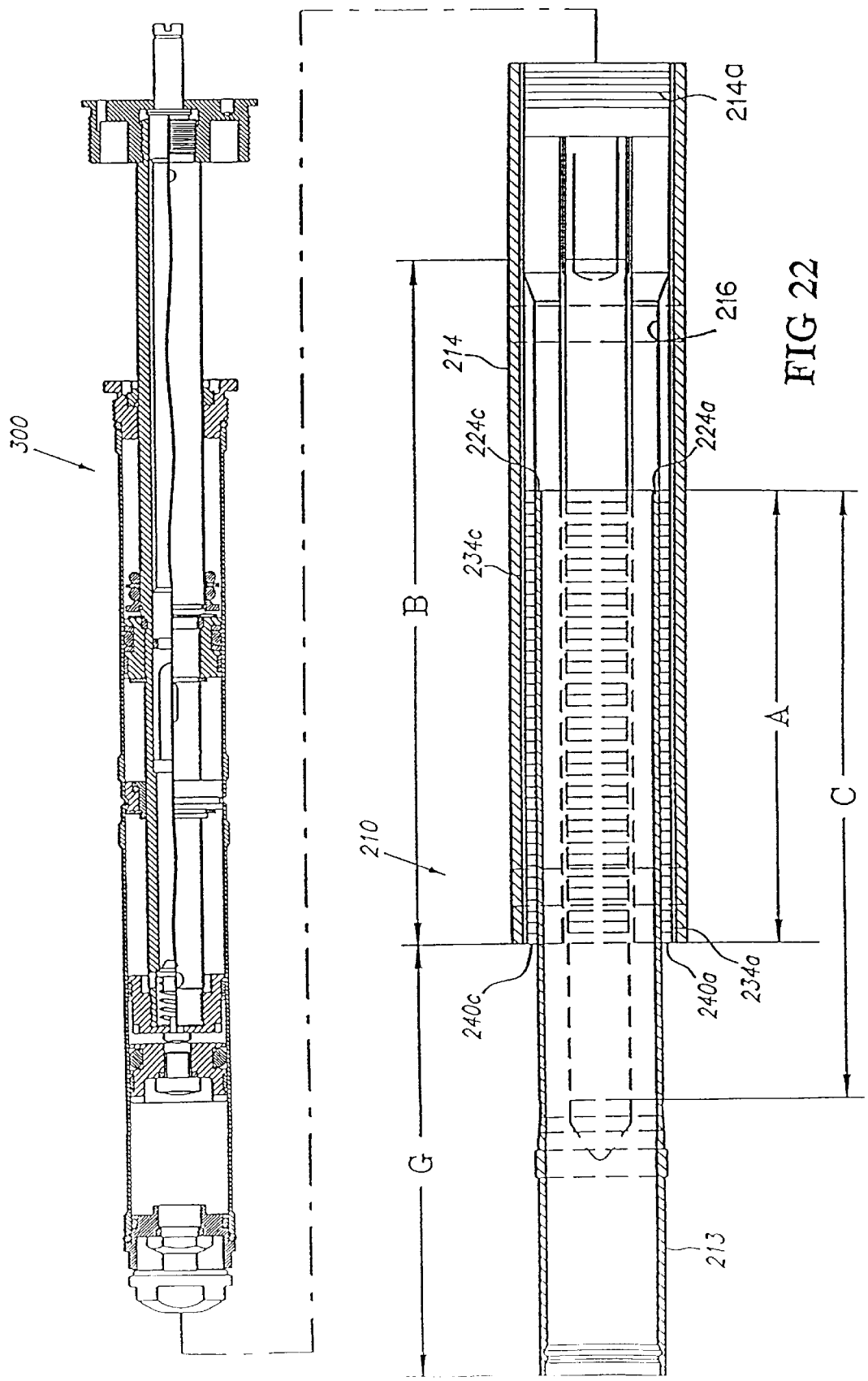
FIG. 22 is a front end view of the telescoping assembly of FIG. 13 in the fully extended position.
Figure 22A:
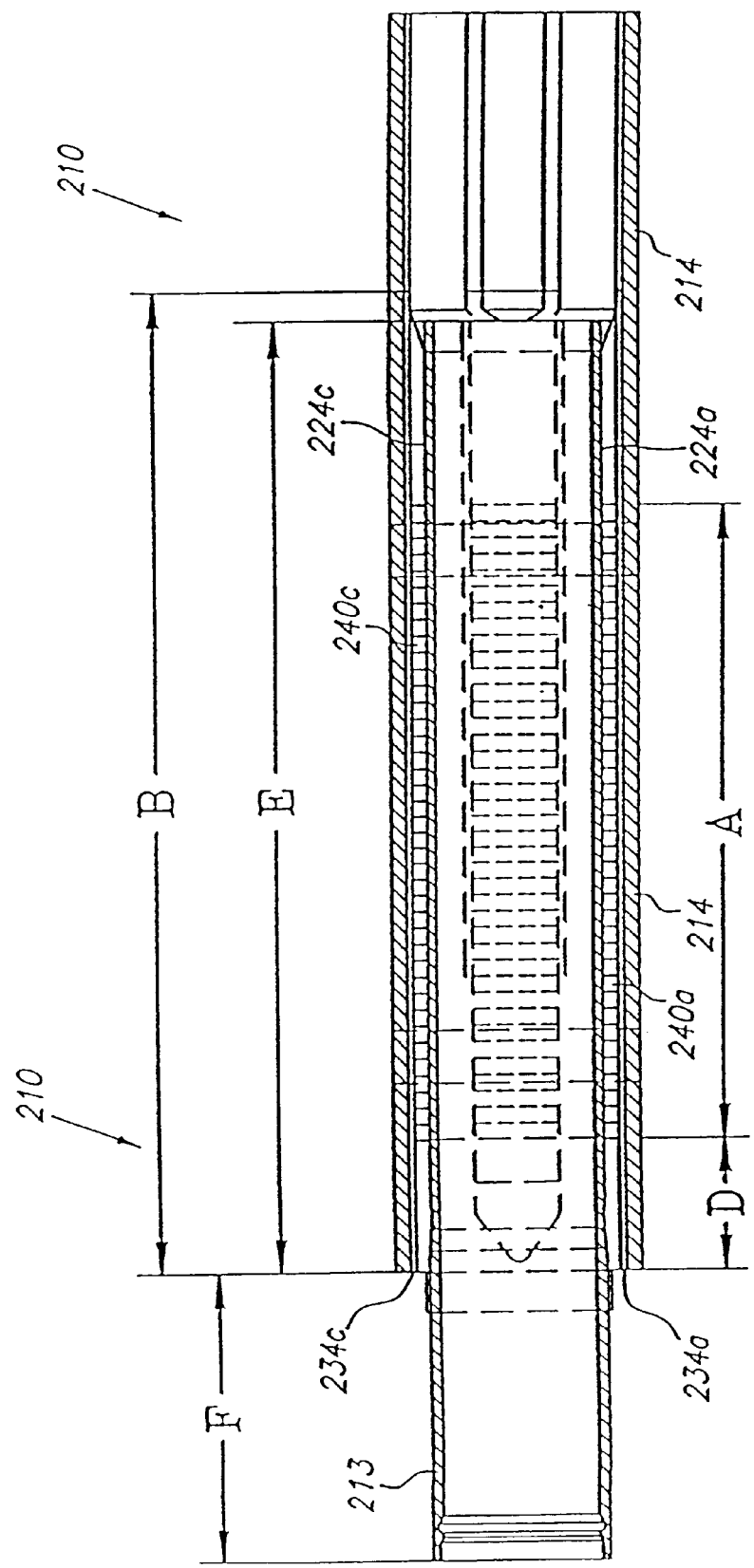
FIG. 22A is a side elevation view of the telescoping assembly in the fully compress position; elevation view in partial cross-section of a preferred shock absorber cartridge for use in the suspension system of the present invention.

As shown in FIG. 22 and 22A, the bearing cages 240a–d are in floating arrangement between the inner tube 213 and the outer tube 214. FIG. 22 illustrates the assembly 210 in the fully extended position and FIG. 22A illustrates the assembly 210 in the fully compressed condition. The desired preload is imposed during assembly to minimize lateral play between the inner tube 213 and the outer tube 214.

In order to provide the desired preload yet avoid overloading which would cause undue friction to any telescoping motion, the assembly method may provide a precise fit of the components. To achieve a precise fit, the tolerances to the inner tube 213 (outer diameters) and the outer tube 214 (inner diameters), as well as the thicknesses of the bearing cages 240a–d and the races 234a–d and 224a–d would have to be held to very small amounts. Requiring such a low tolerance to the inner tube 213 and outer tube 214 would greatly increase material costs. In the previous embodiment disclosed, this adjustment in the manufacture was by means of ramped races. In this preferred manufacturing method, the assembler is provided with a plurality of races of varying thicknesses. These races are readily manufactured to strict tolerances or each race may merely be individually measured and its thickness marked thereon for later use.

The attachable race construction provides that only the surfaces of the races such as inner races 234a–d which come in contact with the bearings 240a–d need be of hardened material. The remaining components such as the inner tube 213 and the outer tube 214 may be of more ductile material which is more easily machined. The races themselves need not be machined and are not required to be manufactured to close tolerances, but only need be manufactured in a range of thicknesses such as from 0.015 to 0.020 inches (0.38–0.51 mm) for the thicknesses of the inner races 234a–d.

Alternate designs may be employed within this construction and method. For example, though four bearing cage/bearing race sets are shown at 90 degree intervals about the circumference, a design with three bearing cage/bearing race sets spaced at 120 degree intervals about the circumference may also be employed and readily implemented by one skilled in the art given the disclosure herein. In such a three set design, one of the race sets should be positioned in the front or rear (preferably the rear) of the tubes (that is bisected by the central longitudinal plane along the steering axis) to accommodate the bending moment acting on the structure. Other cylindrical or clam shell configurations may also be employed.

In the four bearing cage/bearing race set design, the sets are spaced at 90 degree intervals with front and back sets bisected by the central longitudinal plane along the steering axis. Alternatively, the sets may be rotated 45 degrees (about the tube axis) but remaining symmetrical about the central longitudinal plane (along the steering axis).

Though the inner tube 213 shown with a round inner tubular cavity, the cavity may be square shaped and still accommodate the shock absorber cartridge. Similarly, the outer tube 214 may comprise a square shape inner cavity, and in such an embodiment, the inner tube 213 would also preferably be comprised of a square tube shape to facilitate race assemblage.

Following is the preferred method for construction of the attached race assembly.

Step One: In first instance, the outer tube 214 is procured and the four outer races 234a–d are placed in respective slots 232a–d and held in place by a suitable means such as a spring loaded fixture.

Step Two: A precise measurement is taken between respective opposing surfaces of the races, namely a first measurement between races 234a and 234c and then a second measurement between races 234b and 234d. A front side is arbitrarily chosen and marked as such, we will presume for this example that the front corresponds to race 234a and is marked accordingly.

Step 3: Take the inner tube 213 and place the inner races 224a–d and hold them in place by a suitable device such as a spring loaded mechanism or a rubber band or the like. Arbitrarily choosing a front race as say 224a, outer diameter measurements are taken with a micrometer.

Step 4: For each direction pair which has been measured (that is, each front-back and each left-right) for the diameter of the inner races, add two diameters of needle bearings to each diametrical measurement made resulting in measurement A for front-back diameter and amount B for the left-right measurement.

Subtract A from the inner diameter front-back measurement from Step 2 and obtain a value X. Subtract B from the inner diameter left-right measurement from Step 2 and obtain value Y. The values of X and Y will therefore be the diametrical fit or clearance of the unit.

Step 5: It is desirable to have an interference (as opposed to clearance) fit otherwise there will be wobble within the fork. The desired range is as follows:

X=0.002–0.0025 inches (0.051–0.0635 mm)

Y=0.001–0.0015 inches (0.0254–0 .0381 mm)

Step 6: To provide the desired fit, if the measured amount does not meet the appropriate desired range, one of the races from the pair is removed and replaced with another race of either greater or lesser thickness as required to achieve the desired interference fit. For example, if the value for X was determined to be 0.003 inches (0.0762 mm), one of the races would be removed and another race of 0.001 inches (0.0254 mm) less would be installed in its place.

Step 7: Using a suitable fixture element supporting the bearing cages 240a–d position the cages between the inner and outer races approximately half way in a position overlapping the inner tube 213.

Step 8: The inner tube 213 and the outer tube 214 are aligned according to their respective front sides and the outer tube is slid over the bearing/inner tube assembly with the desired press fit so as to achieve the desired initial position for the bearing cages relative to the inner and outer tubes.

In an alternative assembly method and design, the grooves on the steel inner tube 213 may be eliminated and the races merely spot welded in place. Spot welding is not required when grooves are provided and the races are fit within the grooves.

In an alternate assembly method, the assembler measures the actual dimensions of the inner tube 213 and the outer tube 214 (front to back; left to right) along with the actual thickness of the bearing cages 240a–d. The assembler then selects (a) inner and outer race pairs 224a,c–234a,c which provide the desired front to back clearance and (b) inner and outer race pairs 224b,d–234b,d which provide the desired left to right clearance. The result will be an assembly with a precise clearance which when assembled provides the desired preload.

The bearings 240a–d are floating, that is they are not fixed to either the inner tube 213 or the outer tube 214. As shown in FIGS. 22 and 22A, the axial position of the bearing cages 240a–d (having a length "A") is selected such that they are contained between the inner tube 213 and the outer tube 214. When the assembly is at full extension (see FIG. 22) the left most end of the bearing cages 240a–d do not extend outside of the outer tube 214. Also at full extension, the right most end of the bearing cages 240a–d do not extend past the right most end of the inner tube 213. when the assembly is at full compression (see FIG. 22A) the bearing cages 240a–d translate inwardly (to the left) an amount "C" do not extend outside of the outer tube 214. Also at full extension, the right most end of the bearing cages 240a–d do not extend past the right most end of the inner tube 213. Dimensions for the preferred embodiment of the suspension system shown in FIG. 1 are provided as follows:

| Letter Symbol | Element | Length Dimension |
| --- | --- | --- |
| A | bearing cages | 4.0 in (102 mm) |
| B | outer races | 7.25 in (184 mm) |
| C | inner races | 5.25 in (133.35 mm) |
| D | bearing cage travel | 1.0 in (25.4 mm) |
| E | tube overlap (full compression) | 5.856 in (148.74 mm) |
| F | exposed inner tube (full compression) | 2.064 in (52.43 mm) |
| G | exposed inner tube (full extension) | 3.939 in (100.05 mm) |

IMPROVED SHOCK ABSORBING SYSTEM

A preferred embodiment for the suspension assembly as shown in FIGS. 1–3 also includes an improved shock absorbing system 300 illustrated in FIGS. 23–34. The shock absorbing system 300 is comprised of spring and damping elements integrated into a single cartridge housing 320. The cartridge 320 includes an upper cap 415 with threads to couple with the outer tube 214 (see 214a FIGS. 13 and 22) and an upper gland 370 with threads to couple with the inner tube 213 (see 216 in FIGS. 14 and 22). Thus, the shock absorbing system 300 can be easily installed and removed from the inner and outer tubes 213 and 214 and provides resiliency and dampening to restrain the translational movement therebetween and dampens shocks. The shock absorbing system 300 is configured with an air spring 540 and hydraulic damper in series and is particularly suited for the suspension systems shown in FIGS. 1 and 3.

Figure 23:
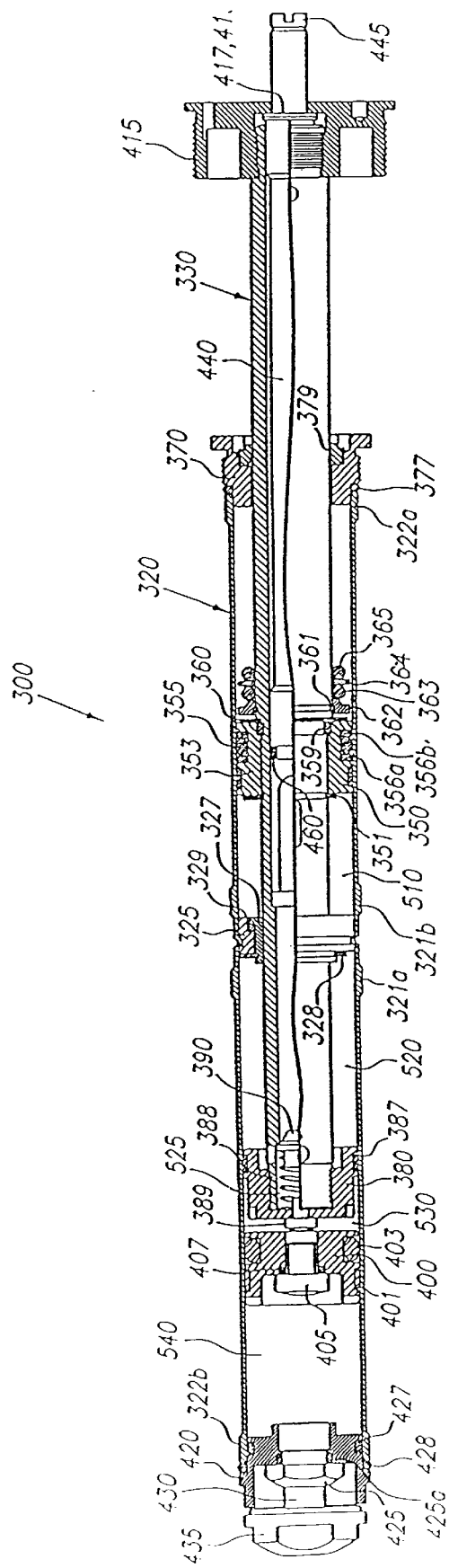
FIG. 23 is a cross-sectional view of a cartridge for use in the suspension systems.
Figure 24:
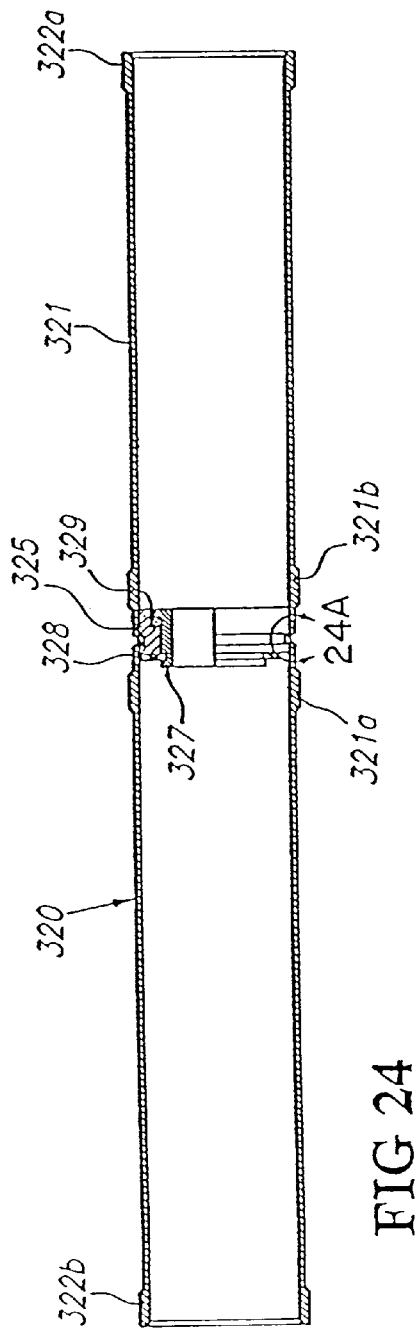
FIG. 24 is a partial cross-sectional view of the cartridge cylinder and cartridge assembly of the suspension cartridge of FIG. 23.

As best shown in FIGS. 23 and 24, the shock absorber system 300 is comprised of an outer cartridge housing 320 with an internal piston shaft 330 connected to an upper piston 350 and a lower piston 380. A fixed bulkhead 325 divides the hydraulic fluid damper into two chambers, an upper chamber 510 and a lower chamber 520. Compression of the piston passes fluid through a suitable orifice in the bulkhead 325 (which is described in detail below) between the upper compartment 510 and the lower compartment 520 to provide the dampening effect of the shock absorber system 300. Compression of an air spring chamber 540 by the free piston 400 and second piston 380 provides the resiliency effect of the shock absorber system 300. The free piston 400 also provides a separation between the air in the air spring chamber 540 and the lower fluid chamber 520. The free piston or separator piston 400 is separate from the second piston 380, that is, the piston 400 is not physically connected thereto and may move axially relative to the second piston 380. However, in practice, the second piston is coupled to the outer tube 214 and the cartridge is coupled to the inner tube 213 such that relative movement causes the second piston 380 to compress the air in the chamber 540 for resiliency. An intermediate fluid chamber 530 is formed between the floating piston 400 and the lower piston 380 to allow for thermal expansion of the hydraulic fluid in chambers 510, 520. Movement of the lower piston will also move the fluid in the chamber 530 and thus the free piston 400. A gas charge is provided into the air chamber 540 through a Schraeder air valve 430 (a valve actuable by a standard bicycle pump) located within the lower gland or plug 420 within the second end 322b of the cartridge 320. A suitable air charge may then be selectively provided through the valve 430 by a high pressure bicycle pump in a range of 100–150 psi (690–1034 kN/m$^2$). An end cap 435 may be installed on the end of the unit to protect the air valve 430 from dirt or damage.

Figure 24A:
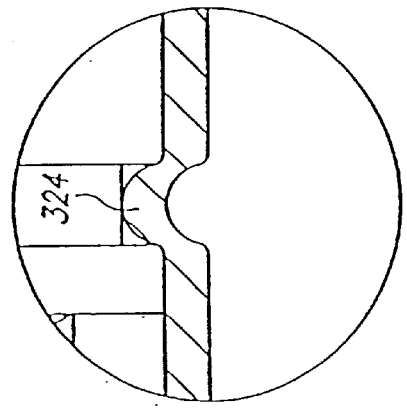
FIG. 24A is a detailed view of the bulk head portion of the cartridge assembly of FIG. 23.

As best shown in FIGS. 23–24, the main cartridge housing 320 is comprised of a central section 321 with first and second ends 322a, 322b. As shown in detail in FIG. 24A, the central portion of the cartridge wall 321 has an inwardly protruding lip 324 against which the bulkhead 325 is installed. A bulkhead bushing 327 is installed between the bulkhead 325 and the piston shaft 330 with an O-ring 329 positioned therebetween to prevent leakage through the two components between the first chamber 510 and the second chamber 520. The O-ring 329 accommodates for lack of concentricity between the shaft and the bulkhead.

Figure 25:
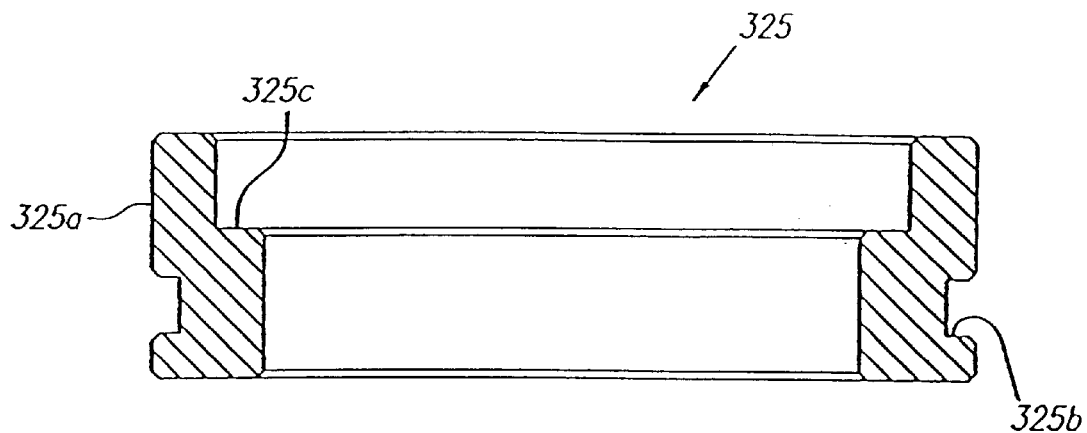
FIG. 25 is a detailed view of the bulkhead.
Figure 26:
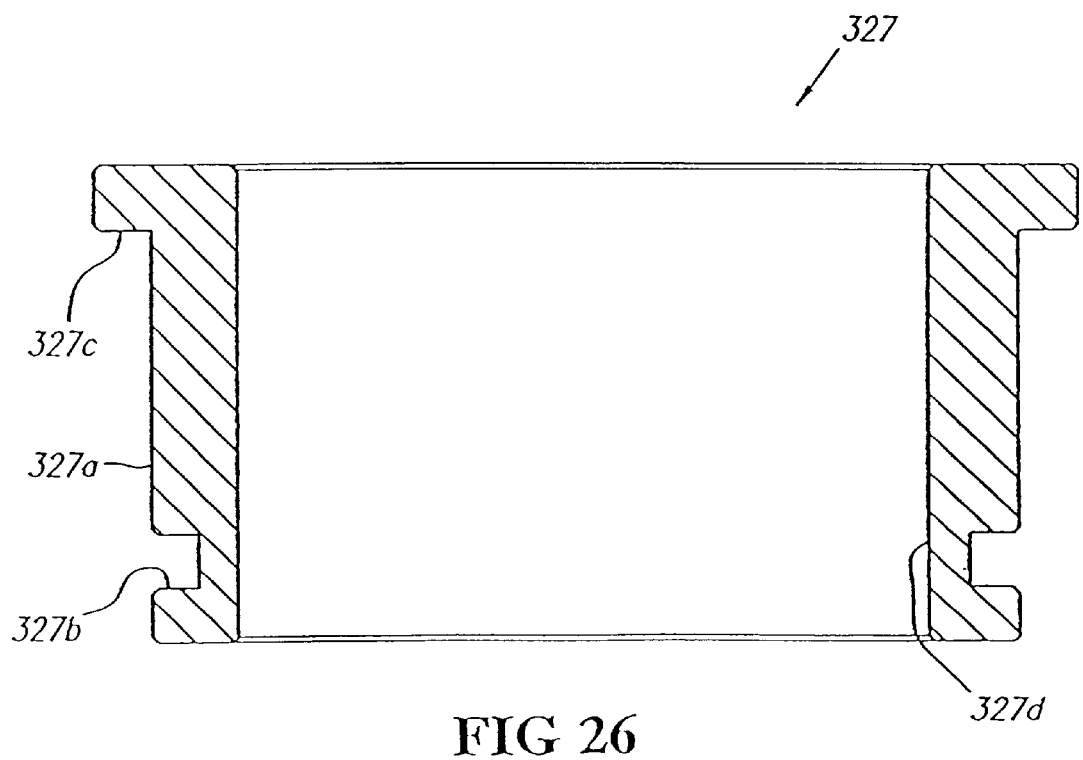
FIG. 26 is a detailed cross-sectional view of the bulkhead bushing.

FIGS. 25 and 26 illustrate details of the bulkhead 325 and the bulkhead bushing 327. The bulkhead 325 includes an annular body portion 325a with an outer annular slot 325b for engaging the cartridge housing protrusion 324 to ensure fixed position for the bulkhead 325. The bulkhead 325 also includes an inner shoulder 325c which cooperates with an outer shoulder 325c in the bulkhead bushing 327 between which the O-ring 329 is installed. The bulkhead bushing 327 is comprised of a tubular shaped body 327a having an outer slot 327b which accommodates the retaining ring 328 previously described. The bulkhead 327 has a smooth sealing surface 327d through which the piston shaft 330 may slide in a sealing relationship.

In manufacture, the bulkhead 325 is placed in position and the outer wall 321 is roller swaged to form the lip 324. The cartridge wall 321 is provided with a pair stiffening rings or enlarged wall thickness portions 321a, 321b located on opposite sides of the lip 324 to inhibit deformation of the cartridge wall 321 during the swage process.

As shown in FIG. 27B, a detent 339 is provided in the side wall 331. The detent 339 may be used in the assembly process to locate the proper relative radial position between the piston shaft 330 and the cartridge housing 320.

As best viewed in FIGS. 27 and 27A–D, the piston shaft 330 is comprised of a central tubular member 331 with a first end 332a and a second end 332b. The first end 332a is threaded into the upper cap 415 which has threads 415a which in turn are threaded onto threads 214a (see FIGS. 13 and 22) in the end of outer tube 214. The piston shaft 330 has a hollow tubular interior 331a. The piston 330 (as best viewed in FIG. 27D) includes a radial indentation 335 in which the retaining ring 351 seats for securing one end of the first piston 350. A second indentation 336 accommodates the O-ring 359 and the shoulder 337 abuts against the thrust washer 360. The piston 350 is therefore secured to the piston shaft 330 between the retaining ring 351 and the thrust washer 360. The O-ring 359 prevents leakage of fluid therebetween.

The piston shaft 330 is also provided with another upper annular recess 338 within which the retainer 361 may be inserted to secure the top out stopper 362 to the shaft 330. A pair of O-rings 363, 365 separated by a spacer 364 are also positioned around the piston shaft 330, the O-ring 365 functioning as a top out bumper. The top out stop 362 and related components help prevent any impact on the first piston 350 during full extension of the unit.

The shock absorbing function is accomplished by passing fluid between the first fluid chamber 510 and the second fluid chamber 520. The hollow interior 331a of the piston shaft 330 provides the passageway for the hydraulic fluid. The piston shaft includes a plurality of orifices in its preferred embodiment: a first round orifice 334a, a second round orifice 334b, each of a given diameter, and a pair of oval or slot orifices 333a, 333b positioned at 180° from the other. The locations of these orifices are best illustrated in FIGS. 27A and 25D. When a particular orifice is aligned with the flow control mechanism (described below), fluid is constricted in relation to the size of the orifice selected thereby providing the desired shock damping force.

In the illustrated embodiment, the first orifice 333a has a diameter of 1.25 mm and the second orifice 334b has a diameter of 1.0 mm. The slot orifices 333a, 333b are sized to permit relatively nonrestricted flow therethrough. The slot orifices 333a, 333b have a width of about 3.0 mm and a length (center to center) of about 6.0 mm.

The radial positions of the orifices 333a,b and slot orifices 333a,b are designed to correspond to a shift positions of an off the shelf shift level, namely the shift level sold under the trademark Accushift, in the SunTour component line of Maeda Industries, Ltd., Osaka, Japan. The actuate (such as a shift lever) is preferably indexed with identifiable or discrete radial positions, sometimes known as "click stops".

Therefore by rotational actuation of the lever to a discrete radial position, a desired position for the tuning shaft 440 may be selected.

Figure 28:
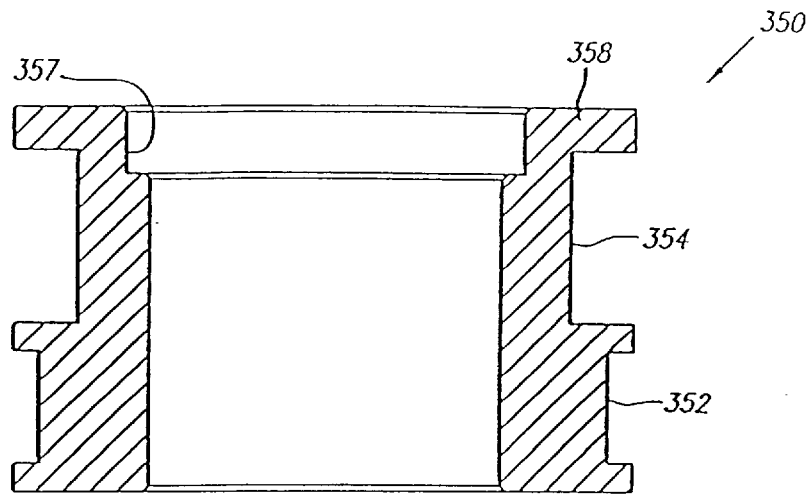
FIG. 28 is a detailed cross-sectional view of the first piston of the cartridge assembly of FIG. 23.

After passing through the respective orifice, the hydraulic fluid path extends along the tubular passageway 331a (as best illustrated in FIGS. 27C) within the piston shaft 330 to the second piston shaft end 332b. The first piston 350 as shown in FIG. 28 is comprised of a main body having an outer flange portion 358 next to an inner circumferential shoulder 357. The O-ring 359 seats within the shoulder 357 to seal off any passage of fluid between the piston 350 and the piston shaft 330. A first outer indentation 354 accommodates an O-ring 355 and a pair of backup rings 356a–b on either side of the O-ring 355. The first piston 350 is also provided with a second outer circumferential indentation 352 for accommodating the wear ring 353. In combination, the wear ring 353 and the O-ring 355 provide a sliding seal between the first piston and an inner circumferential sidewall of the cartridge housing 320.

Figure 29:
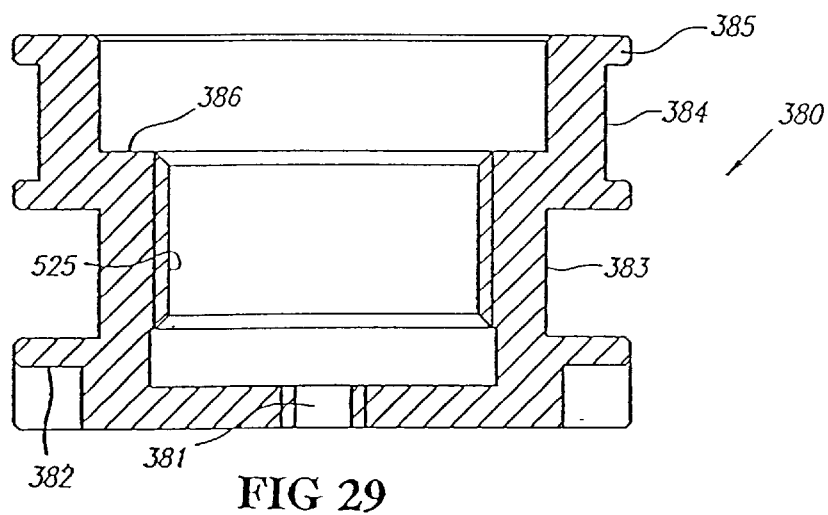
FIG. 29 is a detailed cross-sectional view of the second piston of the cartridge assembly of FIG. 23.

Details of the design of the second piston 380 are shown in FIG. 29. Second piston 380 has a main body housing including a front flange portion 385. An outer annular recess 384 is provided adjacent the flange portion 385. A wear ring 387 is disposed in the recess 384 to provide the sliding fit between the cartridge cylinder wall 321 and the second piston 380 (see FIG. 23). Second piston 380 may also be provided with a second annular recess 383 which may accommodate a seal such as an O-ring (not shown), if desired. Otherwise the recess may be omitted by removal of the flange portion 382 in the rear end thereof. The second piston 380 includes a threaded port 381 bleeding off fluid during assembly. The port 381 is blocked off by a screw 389 after the fluid charge is completed.

Figure 30:
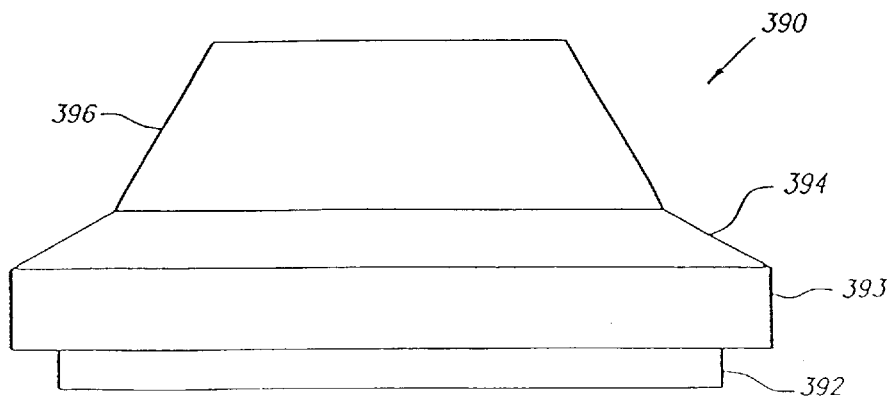
FIG. 30 is a detailed view of the poppet of the cartridge assembly of FIG. 23.

As shown in detail of FIG. 30, the poppet 390 includes a cone-shaped front portion 396 tapered or fanning outward to a seat surface 394 to an outer longitudinal surface 393. The poppet spring 388 urges the seat surface 394 of the poppet 390 against a corresponding seal surface 331b in the piston shaft 330. During compression, fluid pressure within the piston shaft 330 overcomes the spring pressure of, the poppet valve and fluid is permitted to enter into the poppet chamber 525 through holes 342 in the piston shaft 330. The taper on the poppet seat 394 provides a tapered or progressive action, progressive force being provided by the poppet spring 388. The poppet 390 is also provided with a ridged portion 392 to allow some backflow when the poppet is not in operation. A small bypass hole 344 is also provided in the side wall of the piston shaft 330 to permit slow speed bypass of fluid behind the poppet to be vented from the central passage 331a of the piston shaft 330 into the second fluid chamber 520 and vice versa. The hole 344 is relatively small, approximately 1.0 mm in diameter, so only a desirable amount of fluid is permitted to pass therethrough. once the compression force has ceased, the poppet spring 388 closes and the rebound phase also is actuated, the rebound force being provided by the air spring of air chamber 540. The small bypass hole 344 is sized to offer a metered amount of flow restriction.

Figure 31:
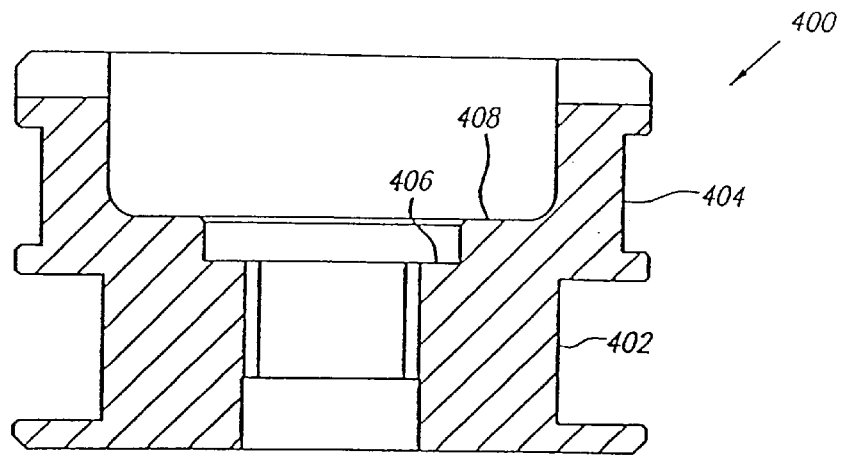
FIG. 31 is a detailed cross-sectional view of the air/oil separator piston of the cartridge assembly of FIG. 23.

FIG. 31 illustrates details of the air/oil separator piston 400. The piston 400 on one end includes a recess forming a shoulder 408 against which the screw head 405 may be mounted. A second shoulder 406 provides a corner surface to accommodate placement of an O-ring 407 to seal between the head of the screw 405 and the body of the separator piston 400. Separator piston 400 also includes a first outer annular recess 404 which accepts a wear ring 401 and a second annular recess 402 which accepts the air/oil seal 403 for providing the sealing and sliding surfaces between the air/oil separator piston 400 and the inner wall of the cartridge cylinder 320. The seal 403 is preferably a quad seal structure manufactured out of nitrile, Buna N or the like. Since the floating seal 400 seeks a zero differential condition, stiction is reduced/minimized as the seal need not seal off a high pressure differential.

Figure 32:
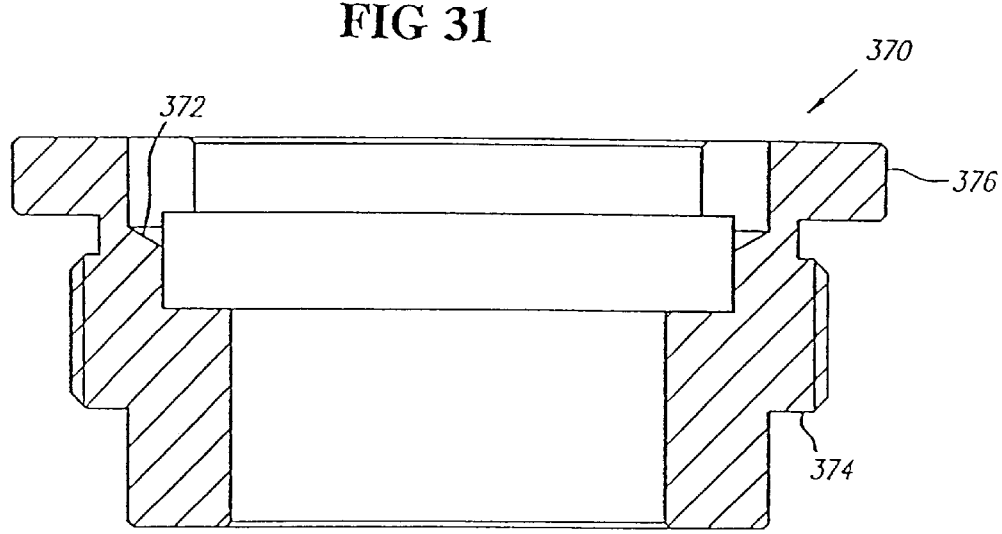
FIG. 32 is a side elevation view of the poppet associated with the second piston of FIG. 30.

The first end 322*a* of the cartridge cylinder 320 is capped off by an upper gland 370 (details of which are illustrated in FIG. 32). The upper gland 370 includes an outer annular lower shoulder 374 which cooperates with an O-ring 377 to seal off between the inner wall of the cartridge cylinder 320 and the upper gland 370. The gland 370 also includes an inner annular recess 372 which accommodates a rod wiper seal 379 to seal off between the piston shaft 330 and the gland 370.

Figure 33:
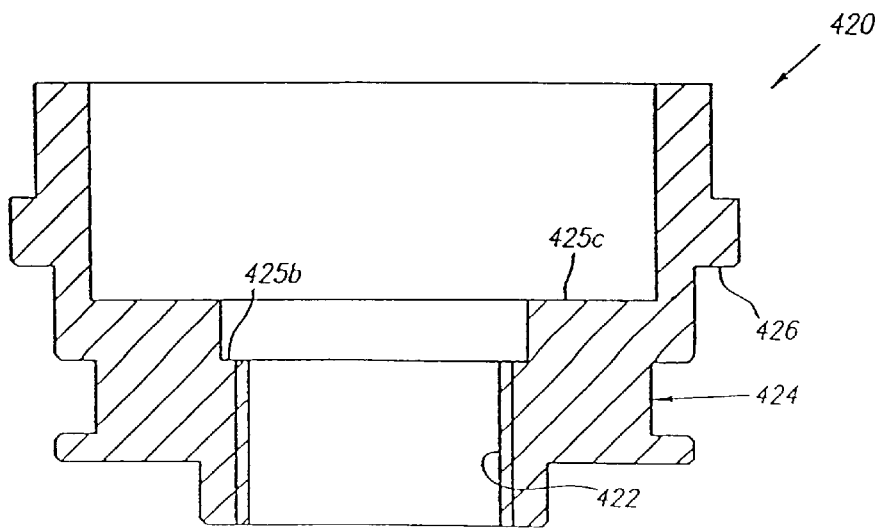
FIG. 33 is a detailed cross-sectional view of a second gland which fits into the second end of the cartridge cylinder of FIG. 24.

A second gland 420 seals off the second end 322*b* of the cartridge cylinder. Details of the second gland are illustrated in FIG. 33. The gland 420 includes a central opening 422 through which the Schraeder valve 430 receives access into the air chamber 540. The Schraeder valve 430 is secured to the gland 420 by a nut 425 with an O-ring 425*a* installed in an inner annular shoulder 425*b*, the nut 425 resting against a second annular shoulder 425*c* within the gland 420. The gland 420 also includes an outer annular shoulder 426 and an outer annular recess 424 which accommodate respective O-rings 428, 427 to seal off between the gland 420 and the side wall of the cartridge cylinder 320.

Figure 34:
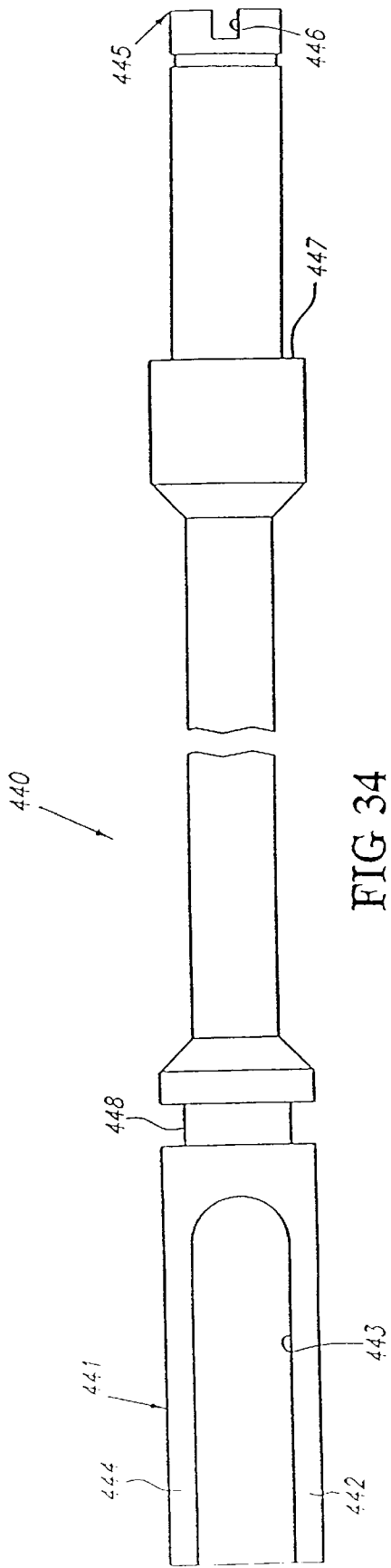
FIG. 34 is a detailed view of the tuning shaft of the cartridge assembly of FIG. 23.

When used in combination with a bicycle, such as a mountain bike, it is expected that the rider may desire to selectively control the stiffness of the shock such as by merely operating a level similar to the level conventionally found for changing gears of the bike. FIG. 23 illustrates a shock absorbing system 300 having a shock adjusting or shock control device including a tuning shaft 440 which permits a variable given shock damping amount to be applied by the unit. FIG. 34 illustrates details of the tuning shaft 440 which has a connector end 445 and a controller end 441. The connector end 445 has a slot 446 for fine tuning of the damping adjustment mechanism. The indexing adjustment mechanism, which may comprise a hand operated controller on the bike (not shown) may then be attached Lo the shaft portion 449.

The tuning shaft 440 extends along the interior of the piston shaft 330 and extends outward pass the outer tube cap 415. Thrust washers 417, 419 are provided between the outer tube cab 415 and the outer shoulder 447 of the tuning shaft to facilitate easy rotation of the tuning shaft 440. The outer tube cap is secured to the first end of the piston shaft 330 by threaded connection or other suitable method. The tuning shaft 440 also includes an outer annular recess 448 just to the side of the control section 441 to accommodate an O-ring 460 to prevent leakage of fluid from the first chamber 510 between the outer surface of the tuning shaft 440 and the inner surface of the piston shaft 330. The control portion 441 of the tuning shaft 440 includes a pair of flutes 442, 444 each having a respective gap 443 therebetween. The flute portion of the tuning shaft and indeed the entire tuning shaft are preferably made of a plastic material, preferably acetal plastic such as that sold under the tradename Delrin. The outer cylindrical surface of the flutes 442, 444 are manufactured to a very precise clearance fit adjacent the holes 334*a*, 334*b*, 333*a*, 333*b* in the piston shaft 330. By turning the tuning shaft to a specific rotational position, the gaps 443 and the tuning shaft 440 will selectively align with a desired hole 334*a*, 334*b* or slot 333*a* or 333*b* in the piston shaft.

In a first operational mode, when the gaps 443 align with a particular hole, such as hole 334*a* or 334*b*, hydraulic fluid is allowed to pass only through that hole and the size of the hole determines the damping rate of the hydraulic member.

In contrast, the slots 333*a* and 333*b* operate as very large holes and when aligned with the gaps 443 in the tuning shaft 440 permit a maximum amount of hydraulic fluid to pass therethrough so that the unit may provide no hydraulic dampening if so desired. In the first and second operational modes, the air spring mechanism remains operational to provide a spring cushion ride. In a third operational mode, the flutes 442 and 444 cover all holes and slots within the piston shaft (i.e., the gaps 443 not aligned with any of the holes 334*a,b* or slots 333*a,b*). In this third mode, the passage of fluid between the chambers is blocked off and due to the inclusion of the bulkhead, when the first piston 350 attempts to compress the fluid within the first chamber 510, there is no place for the fluid to go. Since the hydraulic fluid is practically incompressible, the third mode provides a lock mode ("virtual lock out" for the shock absorber) in which the air spring provides virtually no cushioning effect and the hydraulic members provide virtually no hydraulic shock absorbing effect. In a bicycling application such a setting may be desirable for example when riding on a smooth road surface, sprinting, or out of the saddle climbing.

The described shock design provides a floating oil seal on an air spring cushion. By having the air chamber 540 acting upon the floating oil chamber (the system requires that an air/oil seal be provided between a moving piston and a cylinder wall), high pressure air in the air chamber 540 acts externally on the air/oil sealing surfaces providing additional seal action to prevent leakage of hydraulic fluid from out of the hydraulic chamber. Since the second piston is "floating" on the compressed air spring within the air chamber 540 and any compression by the air/oil separator piston 400 is compensated for by a corresponding increase in pressure in the air chamber 540 rather than having a hydraulic chamber attempting to escape through a sealing surface to a location at atmospheric pressure, the pressure in the air chamber 540 acts to seal and urge the hydraulic fluid to remain within respective hydraulic fluid chambers.

Figure 35:
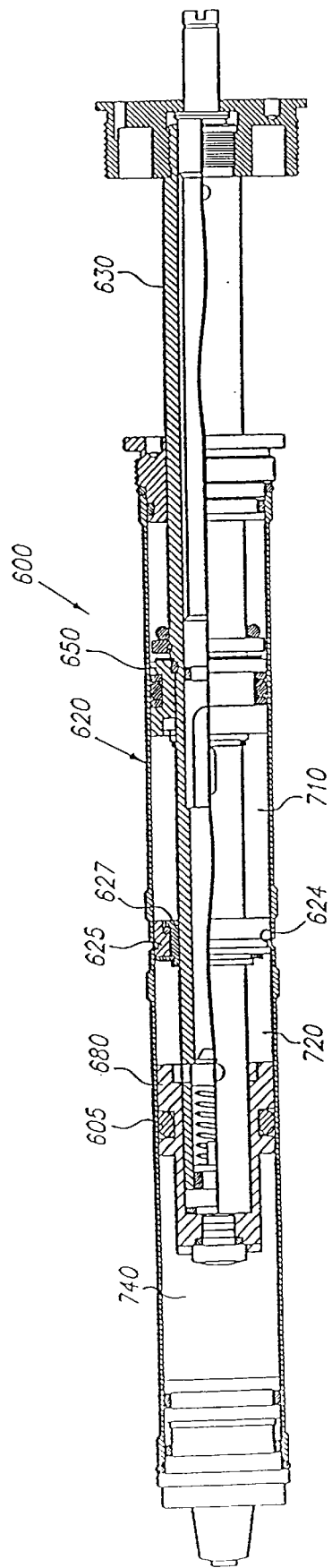
FIG. 35 is a side elevation view in partial cross-section of an alternate shock absorber cartridge.

FIG. 35 is a side elevation view and partial cross section of an alternative shock absorber cartridge 600 having an outer cylinder cartridge 620 and a piston shaft 630 axially disposed therein. The piston shaft 630 includes a first piston cylinder 650 and a second piston cylinder 680. The cartridge cylinder 620 includes a bulkhead lip 624 which secures a bulkhead 625 and bulkhead bushing 627 in position about the piston shaft 630. The bulkhead 625 forms first and second fluid chambers 710, 720. The flow restriction and control aspects of this embodiment are the same as the previous embodiment except for the lower piston 680 is a single/oil separator piston (there is no floating piston in this embodiment) separating the second fluid chamber 720 from the air spring chamber 740. A seal 605 is associated with the second piston 680 between the wall of the cartridge cylinder 620 and the second piston 680 sealing off the fluid chamber 720 from the air chamber 740. As in the previous embodiment, the seal 605 has high pressure air on one side thereof which assists in sealing off and preventing leakage of fluid 720 and shock actuation. Without the floating seal, the cartridge 600 may experience cavitation as a result of thermal expansion/contraction of the hydraulic fluid. A chamber separated by a diaphragm may be provided proximate the second fluid chamber 720, for example, to accommodate for hydraulic fluid expansion/contraction.

A simpler shock absorber system 800 is disclosed in FIG. 36. The shock absorber system has an upper cap 801 for connecting the shock absorber system to the outer tube 214 and an upper gland 802 for connecting the shock absorbing system 800 to the inner tube 213. The system 800 includes a damping element 803 for dampening shocks, which includes a lower fluid chamber 804, an upper fluid chamber 805 and a bulkhead 806 therebetween. A plurality of apertures 807 provide fluid communication between the lower fluid chamber 804 and the upper fluid chamber 805. An upper piston 808 and a lower piston 809 confine the damping fluid in the chambers 804 and 805. The lower piston 809 and a bottom gland 810 define a chamber 811 for containing gas such as air. The lower piston 809, the lower gland 810 and the gas chamber 811 make an air spring 812 for providing suspension resiliency. As those skilled in the art will appreciate, the compressive relative movement between the inner tube 213 and the outer tube 214 will force the damping fluid from the upper chamber 805 into the lower chamber 804 and will compress the gas chamber 811. The restriction of the fluid flow between the chambers 805 and 804 will dampen the translational movement and the compression of the gas in the gas chamber 811 will resist the translational movement.

Figure 38:
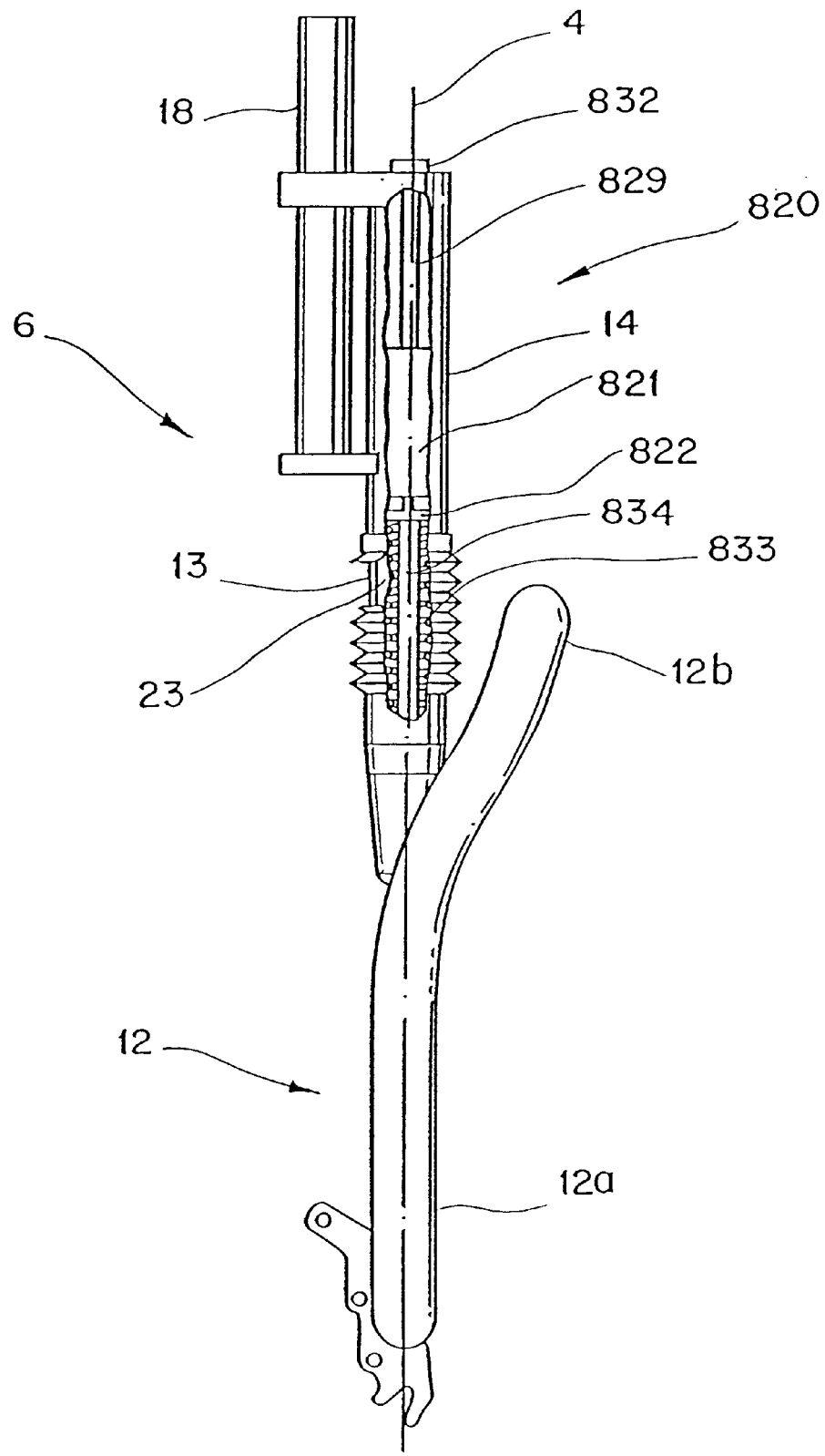
FIG. 38 is side view of the suspension system of FIG. 3A partially cut away to show the shock absorber of FIG. 37.

Turning now FIGS. 37–38, another embodiment of a shock absorber 820 is shown. The shock absorber 820 is comprised of a damping cartridge 821 and a piston 822. The damping cartridge 821 includes two fluid chamber 823 and 824 that are separated by bulkhead 825. A plurality of apertures 826 and shims 827 control the fluid flow between the chambers 823 and 824. Again, the cartridge 821 is connected to the inner tube at a top gland 828. The piston 822 is coupled to the outer tube 214 via telescoping piston shafts 829 and 830 and the upper cap 831. The inner piston shaft 830 is threadingly coupled to the outer piston shaft 829 so that it can be selectively positioned to set the spring preload. Still further, the outer piston shaft 829 is connected to a damping adjustment knob 832 and the shims 827 to selectively adjust the damping of the shock absorbing system 820, i.e, the shims can be rotated to open and close the apertures 826 to provide varying flow rates or to close the apertures 826 completely to lock the shock absorber system 820.

As shown in FIG. 38, the piston 822 compresses a coil spring 833 and an elastomeric spring 834, which is preferably made of a microcellular urethane, in parallel. The spring can be a coil spring or an elastomeric spring or, preferably, the combination of the two. The parallel combination of the coiled spring 833 and the elastomeric spring 834 provides an improved progressive spring constant or resistance to compression, i.e., the spring load increases as the springs are compressed. This combination provides a low spring constant at the beginning of the shock travel, but becomes significantly stiffer at the end of the travel to help resist hard bottom outs from large shocks. As those skilled in the art will appreciate, an air spring could also be used.

While embodiments of the present invention have been shown and described, various modifications may be made without departing from the scope of the present invention, and all such modifications and equivalents are intended to be covered.

What is claimed is:

1. A suspension system for a steerable wheel, the suspension assembly comprising:
    only a single outer tube for fully supporting the wheel from one side;
    only a single inner tube coaxially mounted with the outer tube and adapted to telescope within the outer tube;
    a bracket extending outwardly from the outer tube with the outer tube capable of being coupled to steering components of a vehicle such that the outer tube is offset from a central axis of the steering components; and
    a blade adapted for coupling the lower end of the inner tube to a wheel.

2. A one-sided suspension as claimed in claim 1, wherein:
    the blade further comprises a bracket for coupling to a wheel.

3. A one-sided suspension as claimed in claim 2, wherein:
    the blade further comprises a tubular member having two ends, the upper end connected to the inner tube and the lower end including the bracket for coupling to a wheel.

4. A one-sided suspension as claimed in claim 3, wherein:
    the inner tube having an outer surface with a plurality of axially extending surfaces that are substantially flat;
    the outer tube having an inner surface with a plurality of axially extending surfaces that are substantially flat and aligned radially outward from the inner tube flat surfaces to correspond therewith; and
    a plurality of needle bearing sets, each set being disposed normal to longitudinal axes of said tubes and between the respective inner tube flat surfaces and the outer tube flat surfaces.

5. A one-sided suspension as claimed in claim 4 wherein said sets of needle bearings are arranged in a radially spaced relationship about the inner tube, the flat surface being configured to produce a desired interference fit for the needle bearings between the inner tube and the outer tube.

6. A one-sided suspension as claimed in claim 5 further comprising a plurality of races disposes between the flat surfaces and the sets of needle bearings, the races having thicknesses to produce a desired interference fit for the needle bearings between the inner tube and the outer tube.

7. A one-sided suspension as claimed in claim 4 further including a shock absorbing system disposed within and coupled between said inner and outer tubes.

8. A one-sided suspension as claimed in claim 7 wherein the shock absorbing system is comprised of a cartridge having a first end attached to the inner tube and a second end attached to the outer tube and containing a spring therein.

9. A one-sided suspension as claimed in claim 8 wherein spring is an air spring.

10. A one-sided suspension as claimed in claim 7 wherein the shock absorbing system is comprised of a cartridge having a first end attached to the inner tube and a second end attached to the outer tube and containing a damper therein.

11. A one-sided suspension as claimed in claim 10 wherein the damper is a hydraulic damper comprised of a plurality of fluid chambers that are separated by a bulkhead having a plurality of apertures therethrough to provide fluid communication between the fluid chambers.

12. A one-sided suspension as claimed in claim 7 wherein the shock absorbing system is comprised of a cartridge having a first end attached to the inner tube and a second end attached to the outer tube and containing a spring and a damper therein.

13. A one-sided suspension as claimed in claim 12 wherein the spring is an air spring and the damper is a hydraulic damper.

14. A one-sided suspension assembly for a steerable wheel of a vehicle and being positioned to couple steering components to a wheel, the one-sided suspension assembly comprising:
    only a single outer tube for fully supporting the wheel from one side;
    a bracket having a first end connected to the outer tube and extending away from the outer tube to a second end capable of being coupled to steering components such that the outer tube is offset from a central axis of the steering components;

only a single inner tube coaxially mounted with the outer tube and adapted so that an upper end of the inner tube telescopes within the outer tube and the lower end extends along a side of a wheel;

a plurality of bearing races disposed on an outer surface of the inner tube and on an inner surface of the outer tube; and a plurality of needle bearings disposed between the bearing races.

15. A one-sided suspension as claimed in claim 14 further including a shock absorbing system disposed within and coupled between said inner and outer tubes.

16. A one-sided suspension as claimed in claim 15 wherein the shock absorbing system is comprised of a cartridge having a first end attached to the inner tube and a second end attached to the outer tube and containing a spring therein.

17. A one-sided suspension as claimed in claim 16 wherein spring is an air spring.

18. A one-sided suspension as claimed in claim 15 wherein the shock absorbing system is comprised of a cartridge having a first end attached to the inner tube and a second end attached to the outer tube and containing a damper therein.

19. A one-sided suspension as claimed in claim 18 wherein the damper is a hydraulic damper comprised of a plurality of fluid chambers that are separated by a bulkhead having a plurality of apertures therethrough to provide fluid communication between the fluid chambers.

20. A one-sided suspension as claimed in claim 14 further comprising a front blade having a first part of the blade being secured to a lower end of the inner tube, and a second part of the blade having brackets for coupling to the wheel.

21. A one-sided suspension as claimed in claim 20 wherein the front blade is formed from a tube.

22. A suspension system for a steerable wheel of a vehicle, the suspension assembly comprising:

only a single outer tube for fully supporting the wheel from one side;

only a single inner tube coaxially mounted with the outer tube and adapted to telescope within the outer tube;

two brackets extending outwardly from the outer tube for coupling the outer tube to steering components of the vehicle, one bracket for attaching the outer tube to the steering components adjacent the first end of the outer tube, another bracket for attaching the outer tube to the steering components towards the second end of the outer tube; and a blade adapted for coupling the lower end of the inner tube to a wheel.

23. A one-sided suspension system for a steerable wheel, the one-sided suspension assembly comprising:

only a single outer tube for full supporting the wheel from one side;

only a single inner tube coaxially mounted with the outer tube and adapted to telescope within the outer tube;

a bracket extending outwardly from the outer tube such that the outer tube is capable of being coupled to steering components of a vehicle with the outer tube offset from a central axis of the steering components; and a bracket adapted for coupling the lower end of the inner tube to a wheel.

24. A one-sided suspension system for a steerable wheel, the one-sided suspension assembly comprising:

only a single outer tube for fully supporting the wheel from one side;

only a single inner tube coaxially mounted with the outer tube and adapted to telescope within the outer tube;

a bracket extending outwardly from the outer tube for connection to a steering component of a vehicle with the outer tube at a location offset from a central axis of the outer tube; and a bracket adapted for coupling the lower end of the inner tube to a wheel.

* * * * *